(12) United States Patent
Sokol et al.

(10) Patent No.: US 12,123,627 B2
(45) Date of Patent: Oct. 22, 2024

(54) SOLAR TRACKING SYSTEM SUPPORT DEVICES

(71) Applicant: ARRAY TECH, INC., Albuquerque, NM (US)

(72) Inventors: Jonathan P. Sokol, Houston, TX (US); Michael J. Kuban, Chandler, AZ (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/408,300

(22) Filed: Jan. 9, 2024

(65) Prior Publication Data

US 2024/0240835 A1 Jul. 18, 2024

Related U.S. Application Data

(60) Provisional application No. 63/480,249, filed on Jan. 17, 2023.

(51) Int. Cl.
*F24S 30/425* (2018.01)
*F24S 30/00* (2018.01)
*F24S 50/20* (2018.01)
*H02S 20/32* (2014.01)

(52) U.S. Cl.
CPC ............. *F24S 30/425* (2018.05); *F24S 50/20* (2018.05); *H02S 20/32* (2014.12); *F24S 2030/15* (2018.05)

(58) Field of Classification Search
CPC ...... F24S 30/425; F24S 50/20; F24S 2030/15; H02S 20/32
See application file for complete search history.

(56) References Cited

U.S. PATENT DOCUMENTS

| | | | |
|---|---|---|---|
| 9,347,691 B2 * | 5/2016 | West | F24S 25/12 |
| 9,466,749 B1 * | 10/2016 | Au | F24S 25/10 |
| 10,536,109 B2 | 1/2020 | Corio | |
| 2013/0039610 A1 * | 2/2013 | Schneider | F24S 25/70 384/428 |
| 2015/0200621 A1 | 7/2015 | Reed et al. | |
| 2016/0123383 A1 * | 5/2016 | Lamb | F24S 25/12 384/276 |
| 2020/0403561 A1 | 12/2020 | Corio | |
| 2021/0180832 A1 | 6/2021 | Schuknecht | |
| 2022/0103116 A1 | 3/2022 | Mcpheeters | |
| 2022/0120030 A1 | 6/2022 | Schechter et al. | |
| 2022/0200522 A1 | 6/2022 | De Fresart | |
| 2022/0294386 A1 | 9/2022 | Creasy et al. | |

FOREIGN PATENT DOCUMENTS

DE 202014100397 U1 2/2014

OTHER PUBLICATIONS

European Patent Office; International Search Report and Written Opinion dated Apr. 16, 2024 issued in Int'l Application No. PCT/US2024/011862; 15 pages.

\* cited by examiner

*Primary Examiner* — Seung C Sohn
(74) *Attorney, Agent, or Firm* — MASCHOFF BRENNAN

(57) ABSTRACT

A support device may include a body that includes a surface. The surface may be configured to physically engage with at least a first surface section of a torque tube. In addition, at least a second surface section of the torque tube may be configured to engage with a surface of an attachment structure. The body and the attachment structure may together define an aperture configured to receive the torque tube.

20 Claims, 22 Drawing Sheets

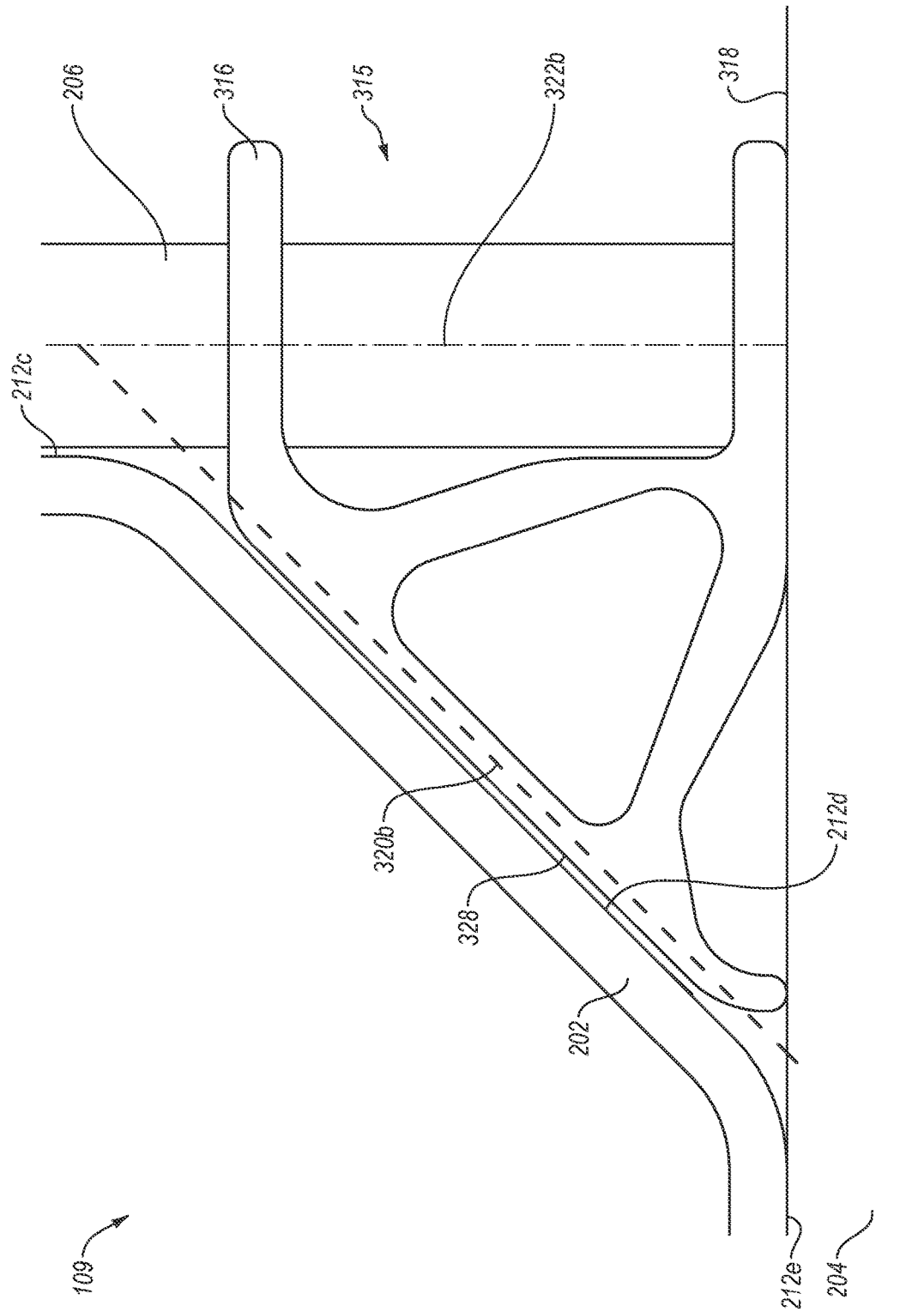

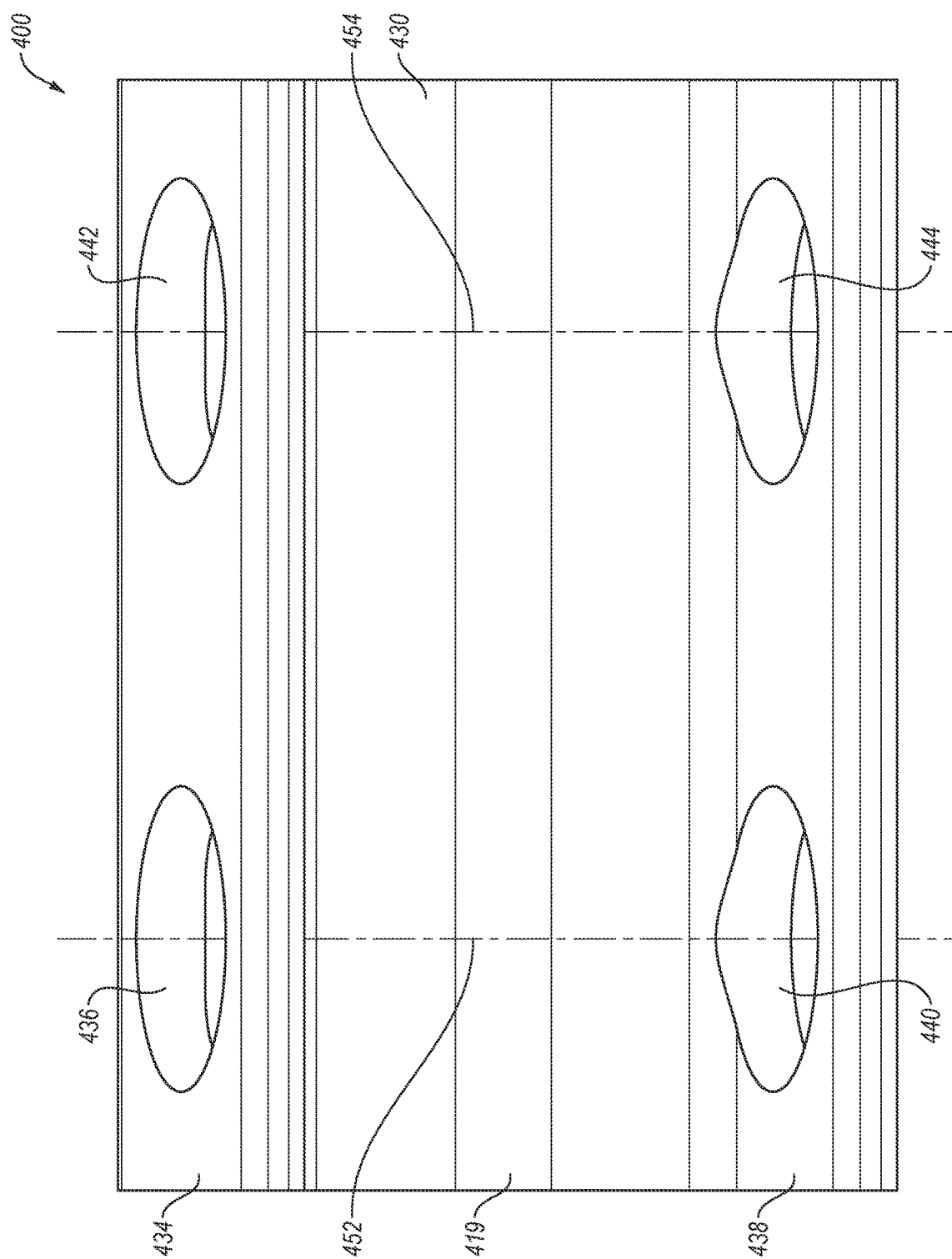

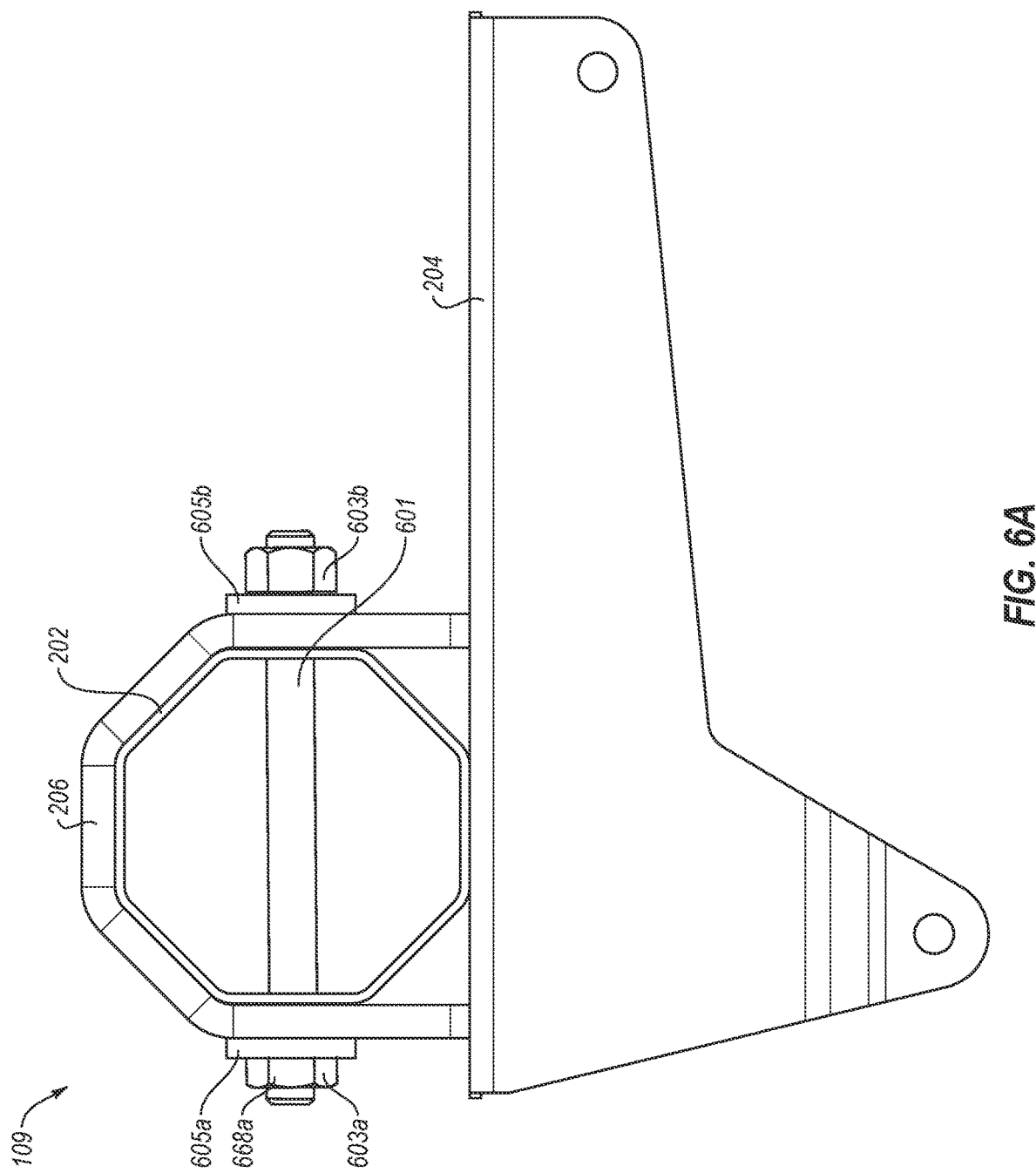

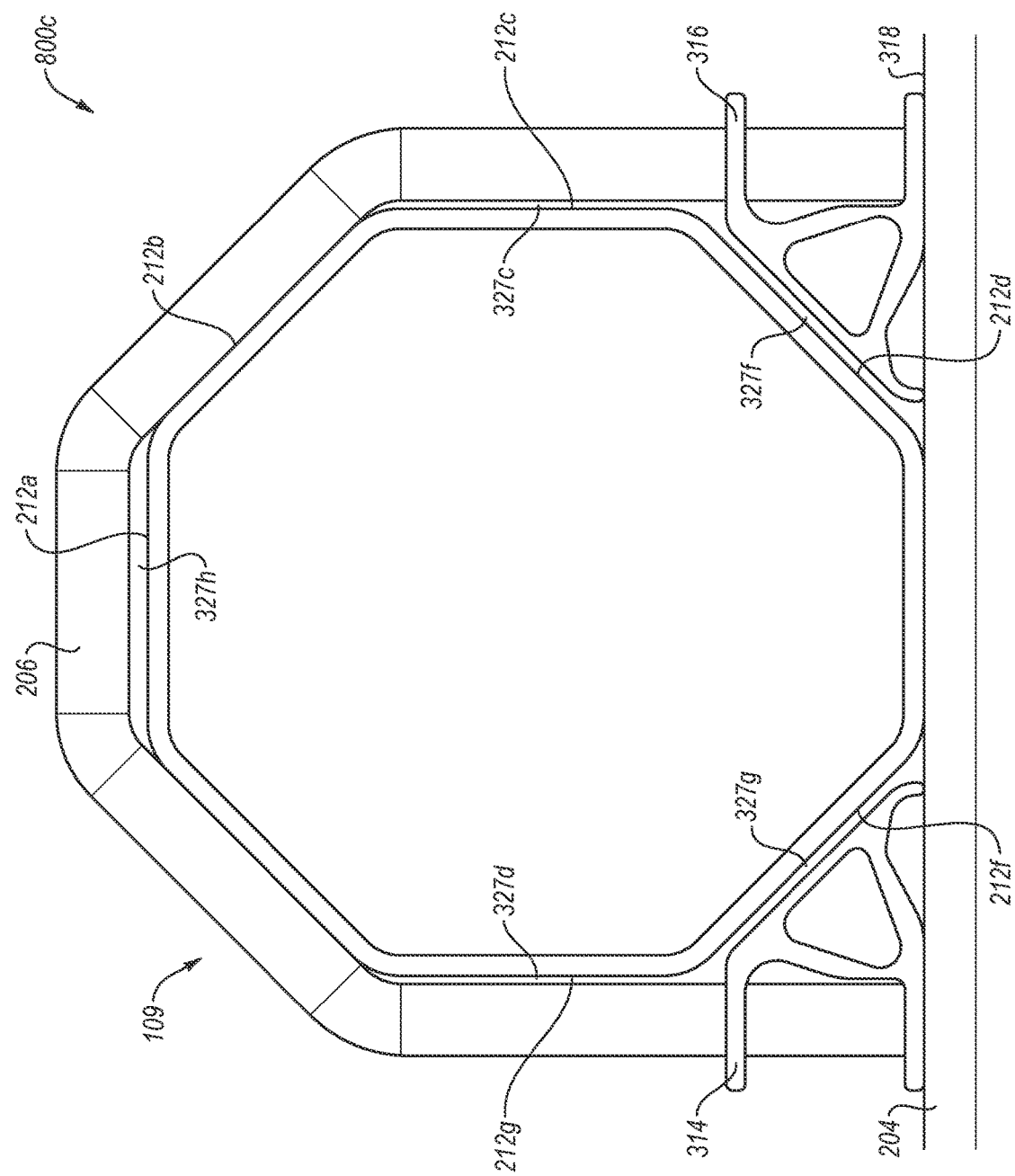

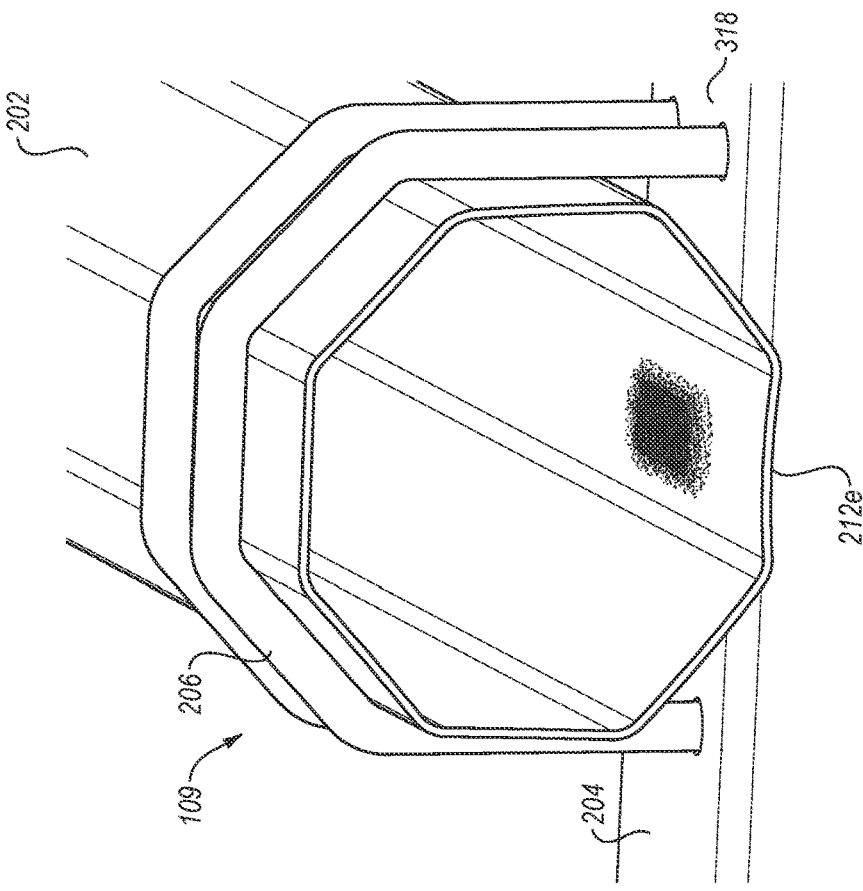
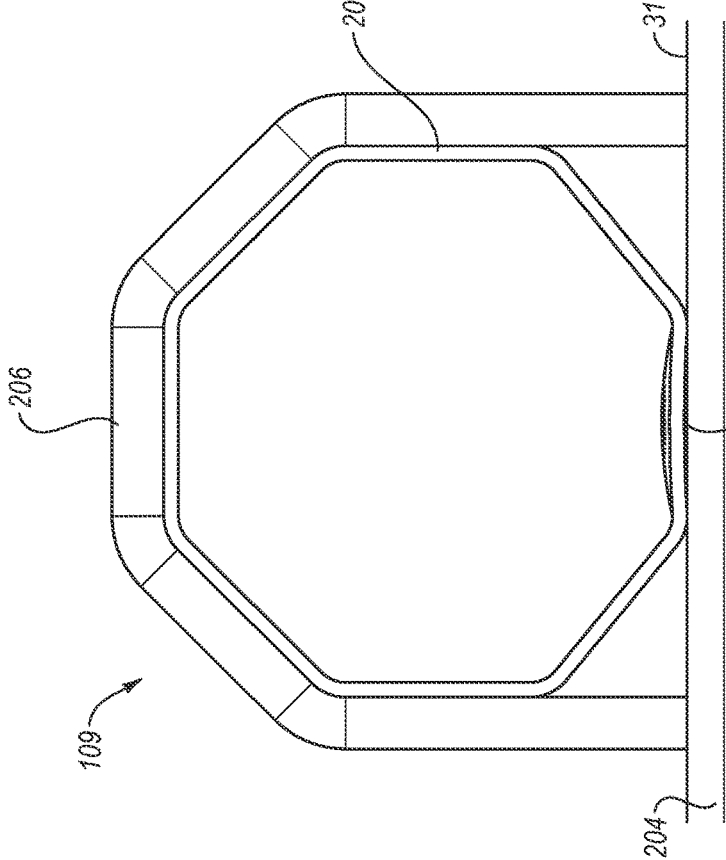

SOLAR TRACKING SYSTEM SUPPORT DEVICES

CROSS-REFERENCE TO RELATED APPLICATION

This patent application claims the benefit of and priority to U.S. Provisional App. No. 63/480,249 filed Jan. 17, 2023, titled "SOLAR TRACKING SYSTEM SUPPORT DEVICES," which is incorporated in the present disclosure by reference in its entirety.

FIELD

The embodiments discussed in the present disclosure are related to solar tracking systems and, more particularly, support devices for use in a solar tracking system.

BACKGROUND

Solar tracking systems are employed in photovoltaic (PV) and solar thermal applications to increase the collection of sunlight by directing PV panels at the sun throughout the sun's daily movement in the sky. In doing so, the solar tracking systems incorporate pivot points or bearings on which to rotate. The solar tracking systems may include a torque tube that is operatively connected to one or more of the PV panels. Other components, such as damping systems, may also be connected at connection points along the torque tube. Tube clamps, such as U-bolt clamps, may physically engage with the torque tube to operatively connect the torque tube to the damping systems or other components of the solar tracking system. During installation of the solar tracking system, the tube clamps may be over-torqued, and the torque tube may be subjected to high compressive forces applied by the tube clamp, which can result in deformation of the torque tube.

A drive system may selectively rotate the torque tube to change the orientation of the one or more PV panels over time to, for example, track movement of the sun and/or to otherwise respond to weather events. During rotation, any joints or connection points along the torque tube can be subject to high rotational forces, which can result in slippage at the joint or connection point, and/or can result in deformation of the torque tube. One solution to this problem is to introduce additional damping systems to compensate for the rotational loads. Increased numbers of damping components may not be desirable due to additional cost and complexity. Moreover, additional damping systems create density inefficiencies because there must be "dead" spaces in a collection surface where the damping systems are located. When used in a large PV solar farm, these dead spaces in the North/South length of a row of PV panels get multiplied by the East/West spacing that is required between the rows of PV panels or collectors and result in considerable density reduction across an entire field.

Accordingly, there is thus a need for an improved system for balancing the compressive forces imposed on the torque tube by the tube clamp. In addition, there is also a need for an improved system for balancing the rotation of a solar tracking system, including reducing rotational loads imposed on the torque tube and any connection/pivot points. There is also a need to improve the tracking system in a manner that minimizes dead spaces, that is less complex, requires less structural material, and results in lower torsional deflection in the solar tracking system, particularly along the torque tube.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address the problems experienced in solar tracking systems, including problems associated with compressive forces and rotational loads imposed at connection points along a torque tube, such as joint slippage and/or deformation of the tube during loading events. Disclosed embodiments address such issues by providing one or more support devices at connection points along the torque tube of a solar tracking system. An exemplary support device is configured so as to increase, or enhance, the connection surface area of an attachment structure that is configured to engage with the outer periphery of the torque tube and thereby facilitate the attachment of a component to the torque tube. The enhanced connection surface area increases the stability of the connection point provided by the attachment structure thereby distributing the compressive forces applied by the tube clamp and/or reducing slippage that may otherwise result from, for example, rotational forces imposed on the torque tube. This is accomplished without the need for introducing, for example, additional damping systems, thereby minimizing complexity and the introduction of dead spaces in the solar tracking system. In addition to reducing complexity and cost (including minimizing the need for additional damping systems), benefits also might include reducing stress on the mechanical drive system, reducing the need for structural material, and reducing torsional deflection on the torque tube.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIGS. 3A-3C illustrate a perspective view, a side view, and a detail view, respectively, of the example attachment structure of FIG. 1, further including example support devices that increase the connection surface area between the attachment structure and the torque tube;

FIGS. 4A-4C illustrate a perspective view, a top view, and a rear view, respectively, of one example of the support device of FIGS. 3A-3C;

FIGS. 6A-6F illustrate the example attachment structure of FIG. 1, further including different example support devices;

FIGS. 8A-8C illustrate example configurations of the example attachment structure of FIG. 1 and the support devices;

FIGS. 9A and 9B illustrate the example attachment structure of FIG. 1 and the example torque tube of FIG. 1.

all according to at least one embodiment described in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
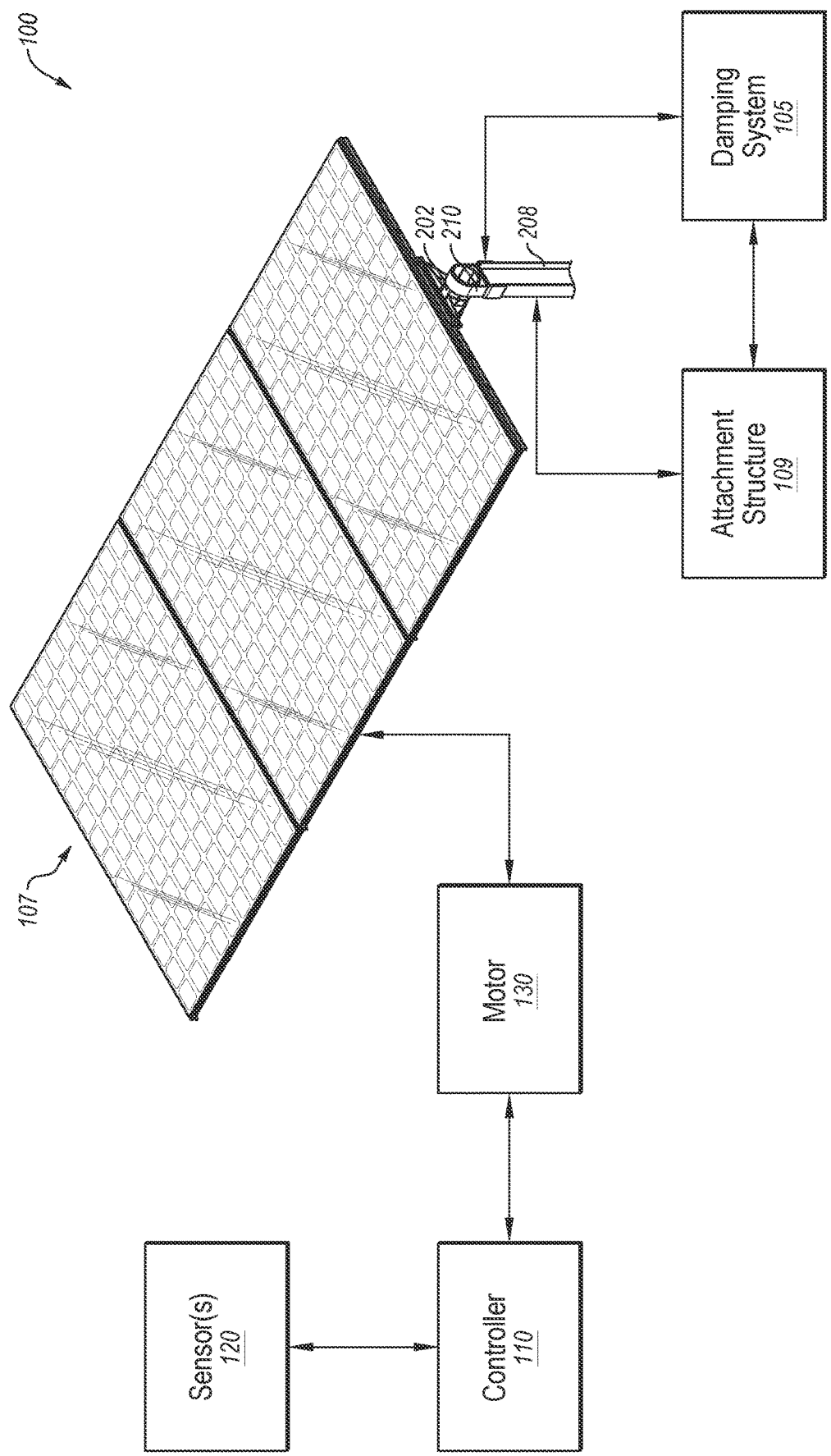
FIG. 1 illustrates a block diagram of an example solar tracking system.

Referring to FIG. 1, an example embodiment of a solar tracking system 100 may include a support column 208, a torque tube 202 connected to the support column 208 via a mounting mechanism such as a bearing bracket 210 and a rotating bearing 211 (shown in FIG. 2), a drive system (which may include a motor 130, a controller 110, and related sensor(s) 120) connected to the torque tube 202, and a damping system 105 operably connected to the torque tube 202. The example embodiment includes an attachment structure, functionally denoted at 109, which in this embodiment operatively connects a solar component, such as the damping system 105, to the torque tube 202. As described in further detail below, in one example embodiment, the attachment structure 109 may include a tube clamp, such as a U-bolt clamp, that is sized and shaped to physically engage with one or more surfaces of the torque tube 202. The attachment structure 109 may also be implemented in conjunction with a separate support bracket that also physically engages with one or more surfaces of the torque tube 202. Examples of an attachment structure configured in this manner are described in more detail below.

With continued reference to FIG. 1, a drive system, including the controller 110, the motor 130, and the sensor(s) 120, are operatively connected to the torque tube 202. The torque tube 202 is connected to one or more PV panels, such as is denoted at 107. The controller 110 may control operation of the motor 130 so as to rotate the torque tube 202 and thereby manipulate the orientation of the PV panels 107 In this way, the drive system may facilitate tracking the location of the sun with the PV panels 107 such that the PV panels 107 may be generally oriented normal to the sun or normal to the east-west portion of the irradiance of the sun, which may facilitate increased electrical energy generation. The damping system 105 may provide damping during rotation of the torque tube 202 to dampen movement of the PV panels 107 due to rotational forces.

Figure 2:
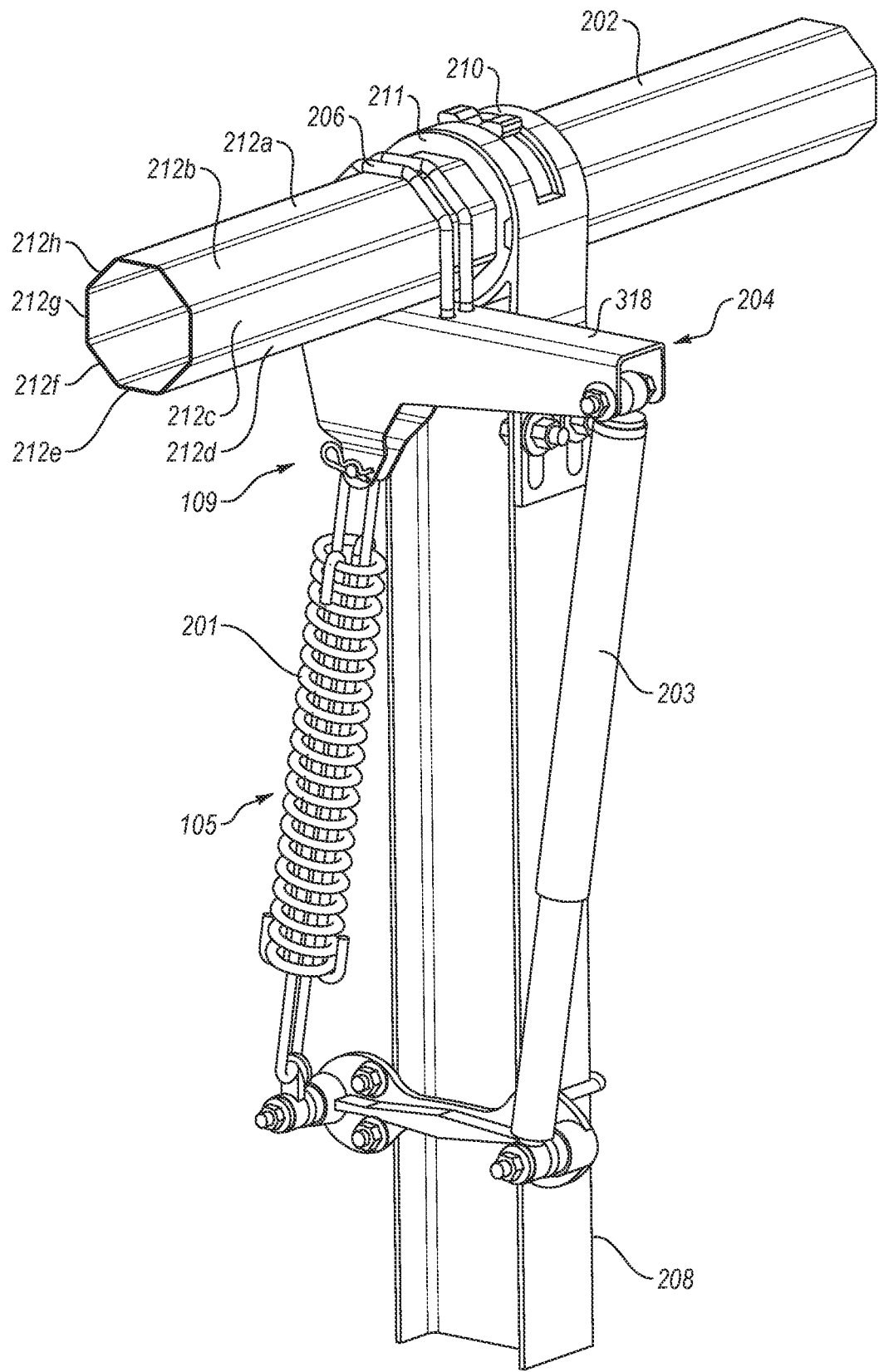
FIG. 2 illustrates additional details of the example solar tracking system of FIG. 1, including an example attachment structure that operatively connects a damping system to a torque tube.

FIG. 2 illustrates additional details of the example solar tracking system 100 of FIG. 1, including the example attachment structure denoted at 109. In this particular example, the attachment structure 109 connects the damping system 105 to the torque tube 202. Although other configurations could be used, the illustrated damping system 105 may include a spring 201 and a damper 203. The attachment structure 109 may include a support bracket 204 and a tube clamp 206. The tube clamp 206, as illustrated in FIG. 2, may include two U-shaped bolts. In some embodiments, the tube clamp 206 may include one U-shaped bolt or three or more U-shaped bolts. It will be appreciated that the tube clamp 206 might have various other configurations and shapes.

The bearing 211 may operably interface with the torque tube 202. The mounting mechanism or bearing bracket 210 may mechanically couple the torque tube 202 to the support column 208 in a manner that permits rotation of the torque tube 202 via the bearing 211. Additionally, the attachment structure 109 may operably interface with the torque tube 202 to mechanically couple the torque tube 202 to the support column 208 via the damping system 105. In this way, the damping system 105 may absorb some of the rotational forces imposed on the torque tube 202 as it is rotated in a manner that is well known. In some embodiments, the torque tube 202 may include a predefined cross-sectional shape. In the embodiment of FIG. 2, the torque tube 202 has an octagonal shape having eight sides. Each of the sides may include a corresponding surface 212a-h (referenced collectively in the present disclosure as "surfaces 212"). The torque tube 202 may include any appropriate cross-sectional shape. For example, the cross-sectional shape of the torque tube 202 may include a square shape, a pentagonal shape, a hexagonal shape, a heptagonal shape, a nonagonal shape, or any other multi-sided shape. Alternatively, the cross-sectional shape of the torque tube 202 may include a circular shape.

Figure 8A:
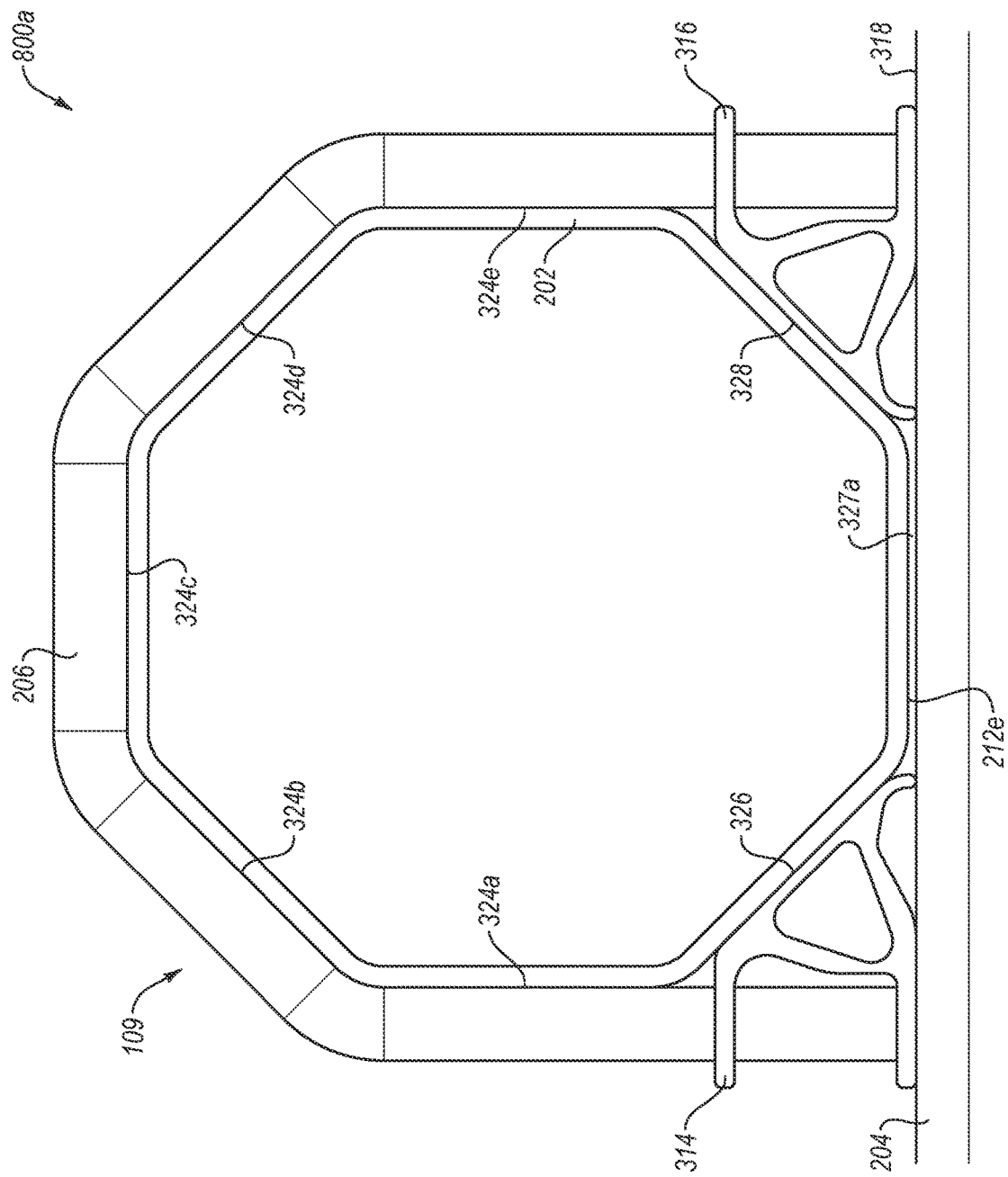
Figure 8B:
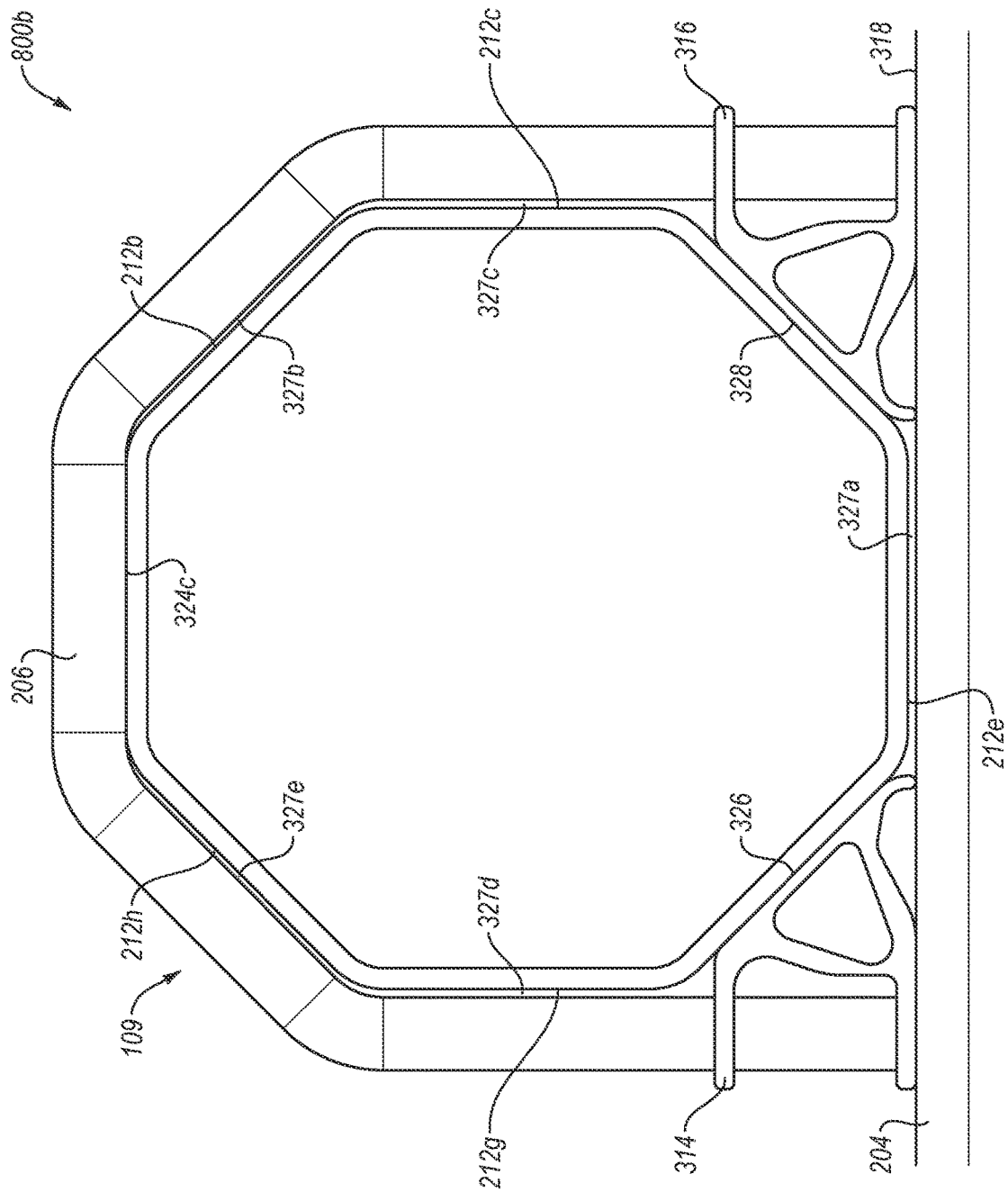

The attachment structure 109, including the tube clamp 206 and a top surface 318 of the support bracket 204, may be sized and shaped to physically engage with at least some of the surfaces 212 of the torque tube 202. For example, as illustrated in FIG. 2, the tube clamp 206 may be sized and shaped to physically engage with a first surface 212a, a second surface 212b, a third surface 212c, a seventh surface 212g, an eighth surface 212h, or some combination thereof of the torque tube 202. In addition, the support bracket 204 may include a surface (here the top surface 318) that physically engages with a fifth surface 212e of the torque tube 202. As illustrated in FIG. 2, the tube clamp 206 and the support bracket 204 may not physically engage with a fourth surface 212d and a sixth surface 212f of the torque tube 202. In addition, as illustrated in FIGS. 8A and 8B, the tube clamp 206 and the support bracket 204 may not physically engage with each of the surfaces 212 of the torque tube 202.

The spring 201, the damper 203, or both may act to dampen rotational forces exerted on the torque tube 202 as it is rotated relative to the mounting mechanism or bearing bracket 210 via the bearing 211. In some embodiments, as the torque tube 202 is rotated, the spring 201 may apply a biasing force on the support bracket 204 (e.g., the torque tube 202 via the support bracket 204 and the tube clamp 206) to dampen or control the movement of the torque tube 202. For example, the spring 201 may apply a spring force on the support bracket 204, which may dampen or control the movement of the torque tube 202. In these and other embodiments, the damper 203 may apply a biasing force on the support bracket 204 (e.g., the torque tube 202 via the support bracket 204 and the tube clamp 206) to dampen the movement of the torque tube 202. For example, the damping of the movement of the support bracket 204 (e.g., the torque tube 202) may dampen oscillation movements of the torque tube 202.

During installation of the attachment structure 109, the tube clamp 206 may operably attach to the support bracket 204. The tube clamp 206 may apply a compressive force to physically engage the torque tube 202 to the support bracket 204. The tube clamp 206 may be over-torqued, which may result in disproportionate forces to occur on surfaces 212 of the torque tube 202, thereby resulting in deformation of the torque tube 202. For example, as illustrated in FIGS. 9A and 9B, the tube clamp 206 may be over-torqued, which may result in disproportionate forces to occur on the fifth surface 212e of the torque tube 202, thereby resulting in deformation of the torque tube 202.

As noted above, the attachment structure 109 (e.g., the tube clamp 206 and/or the support bracket 204) does not engage some of the surfaces 212 of the torque tube 202 (in this particular example the fourth surface 212d and the sixth surface 212f). These gaps, or non-engaged surfaces, present a non-supported region that, during rotation, may result in the torque tube 202 slipping relative to the attachment structure 109. Similarly, this lack of physical engagement between the attachment structure 109 and the non-engaged surfaces of the torque tube 202 may result in disproportionate forces to occur in the other areas of "engaged" surfaces, thereby resulting in deformation of the torque tube 202.

To address these problems, some embodiments described in the present disclosure may include at least one support device that provides support in the regions of the non-engaged surfaces of the torque tube 202. The support device(s) may also add structural support to the physical engagement between the torque tube 202 and the attachment structure 109. In some embodiments, the support devices may also increase a connection surface area that engages the torque tube 202 to resist deformation of the torque tube 202 due to rotation of the torque tube 202 and/or during loading events. In these and other embodiments, the support devices may distribute the compressive forces applied by the tube clamp to more surfaces of the torque tube.

Figure 3A:
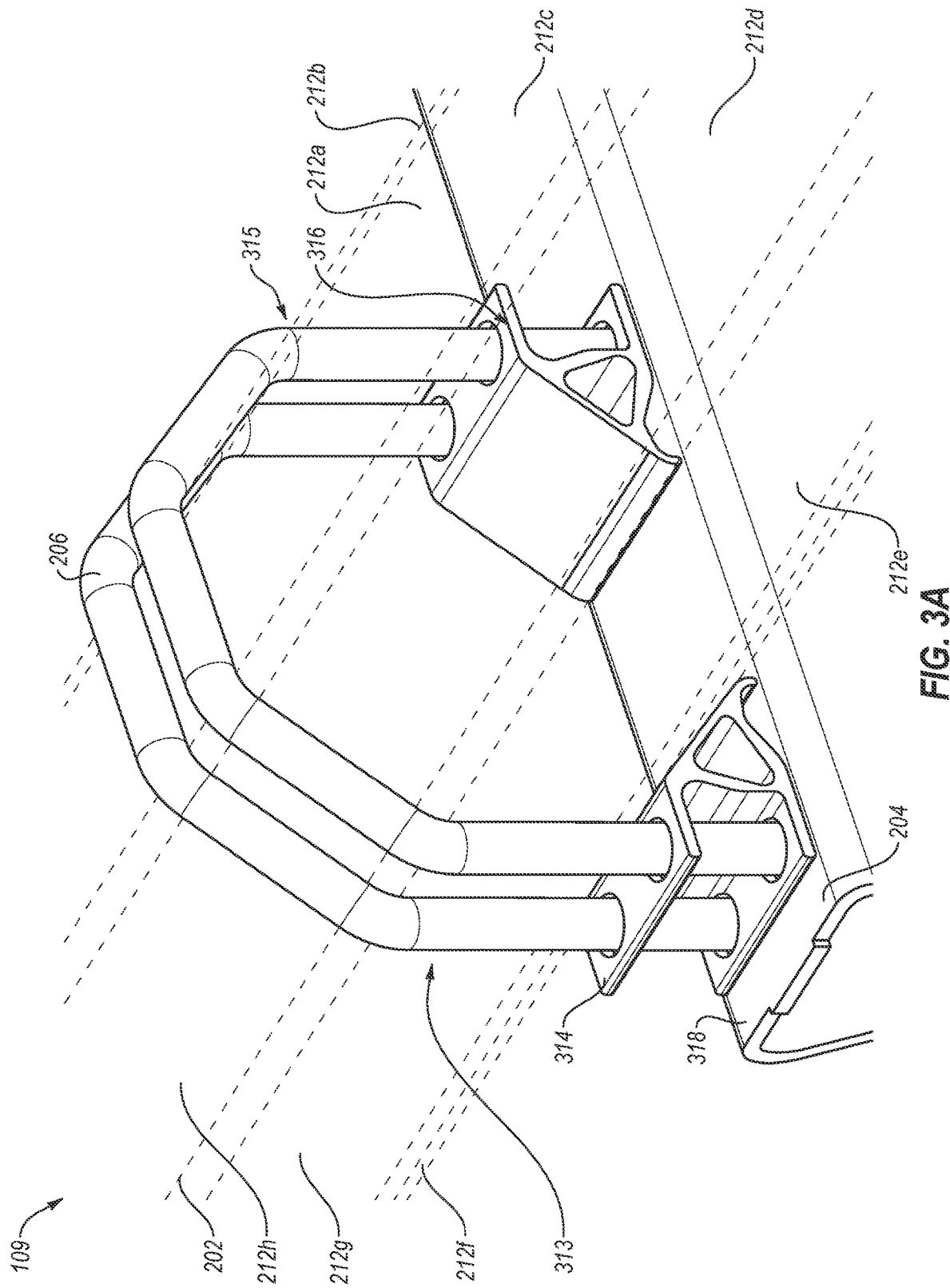
Figure 3B:
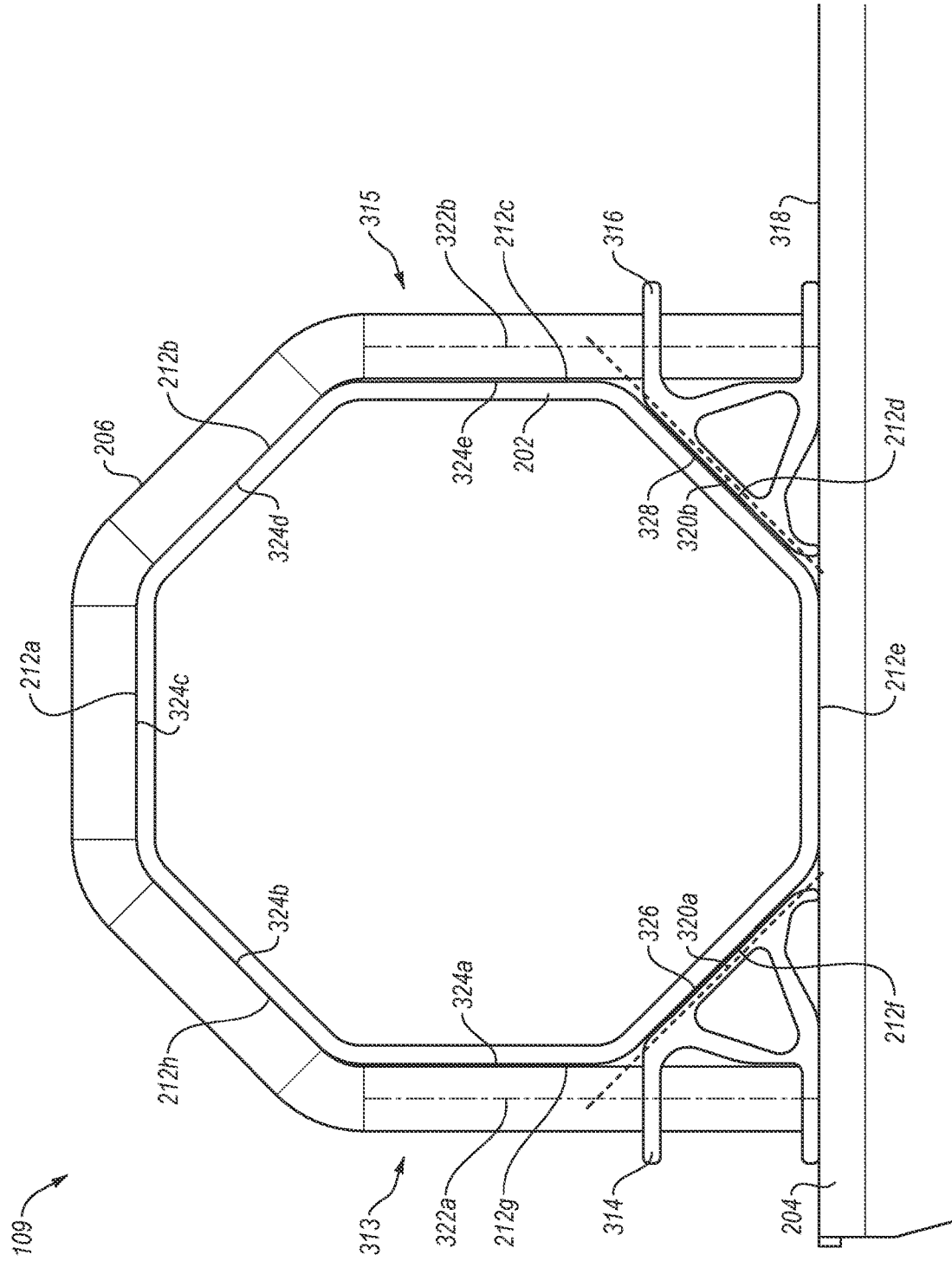

FIGS. 3A-3C illustrate a perspective view, a side view, and a detail view, respectively, of the example attachment structure 109 of FIG. 1, further including example support devices 314 and 316 that increase the connection surface area between the attachment structure 109 and the torque tube 202. As can be seen, the support devices 314 and 316 each provide supplementary support surfaces (e.g., a first surface 326 of a first support device 314 and a second surface 328 of a second support device 316), thereby eliminating the gaps noted above in connection with FIG. 2, for example.

In some embodiments, the first support device 314 and the second support device 316 may be sized and shaped to address non-engaged surfaces between the torque tube 202 and the attachment structure 109 (as collectively provided via the tube clamp 206 and the top surface 318). In these and other embodiments, the first support device 314, the second support device 316, or both may cooperatively operate with the tube clamp 206 and the top surface 318 of the support bracket 204 to resist unintended rotation (or slippage) of the torque tube 202 relative to the attachment structure 109. In addition, the first support device 314, the second support device 316, or both may add structural support to the physical engagement between the torque tube 202 and the attachment structure 109 compared to the tube clamp 206 and the support bracket 204 alone. In some embodiments, the first support device 314, the second support device 316, or both may also increase the connection surface area of the attachment structure 109 that engages the torque tube 202 to resist slippage and/or deformation of the torque tube 202 due to rotation of the torque tube 202 compared to the tube clamp 206 and the support bracket 204 alone.

The tube clamp 206, as illustrated in FIGS. 3A-3C, may include two U-shaped bolts. In some embodiments, the tube clamp 206 may include one U-shaped bolt or three or more U-shaped bolts. It will be appreciated that the tube clamp 206 might have various other configurations and shapes. In some embodiments, one support device or three or more support devices may be used. For example, only the first support device 314 or only the second support device 316 may be used. In some embodiments, the first support device 314, the second support device 316, the attachment structure 109, or some combination thereof may define an aperture configured to receive the torque tube 202.

In the embodiment of FIGS. 3A-3C, the torque tube 202 has an octagonal cross-sectional shape having eight sides. However, the torque tube 202 may include any appropriate cross-sectional shape. For example, the cross-sectional shape of the torque tube 202 may include a square shape, a pentagonal shape, a hexagonal shape, a heptagonal shape, a nonagonal shape, a circular shape, or any other shape. The first support device 314, the second support device 316, the tube clamp 206, the support bracket 204, or some combination thereof may form a cross-sectional shape that is shaped and sized to mate with the surfaces 212 of the torque tube 202.

The first support device 314 may be configured to be physically positioned between the tube clamp 206, the torque tube 202, the support bracket 204, or some combination thereof. In addition, the second support device 316 may be configured to be physically positioned between the tube clamp 206, the torque tube 202, the support bracket 204, or some combination thereof. In some embodiments, the first support device 314 and the second support device 316 may be called U-bolt support wedges.

In some embodiments, as illustrated in FIGS. 3A-3C, the tube clamp 206, the top surface 318 of the support bracket 204, the first support device 314, and the second support device 316 may physically engage with each of the surfaces 212 of the torque tube 202. In other embodiments, the tube clamp 206, the top surface 318 of the support bracket 204, the first support device 314, the second support device 316, or some combination thereof may physically engage with a portion of the surfaces 212 of the torque tube 202. For example, the first support device 314, the second support device 316, the tube clamp 206, or some combination thereof may physically engage with the surfaces 212 such that the fifth surface 212e and the top surface 318 of the support bracket 204 form a gap 327a as illustrated in FIGS. 8A and 8B. Additional configurations of the first support device 314, the second support device 316, and the attachment structure 109 are described in more detail below in relation to FIGS. 8A-8C. The first support device 314, the second support device 316, or both may increase the number of surfaces that physically engage with the surfaces 212 of the torque tube 202 compared to the tube clamp 206 and support bracket 204 alone.

In some embodiments, the top surface 318 of the support bracket 204 may be configured to physically engage with the fifth surface 212e. In these and other embodiments, the tube clamp 206 may include interior surfaces 324a-e configured to physically engage with the first surface 212a, the second surface 212b, the third surface 212c, the seventh surface 212g, and the eighth surface 212h. Additionally, the first surface 326 may be configured to physically engage with the sixth surface 212*f*. Further, the second surface 328 may be configured to physically engage with the fourth surface 212*d*. The first surface 326 and the second surface 328 may physically engage with the sixth surface 212*f* and the fourth surface 212*d*, respectively to the provide support in the regions of the non-engaged surfaces by the attachment structure 109.

In some embodiments, ends (not illustrated in FIGS. 3A-3C) of the tube clamp 206 may include threaded portions configured to operably interface with fasteners (not illustrated in FIGS. 3A-3C). In these and other embodiments, the ends of the tube clamp 206 may pass through openings (not illustrated in FIGS. 3A-3C) defined by the top surface 318 of the support bracket 204. The fasteners may attach to the threaded portions to operably attach the tube clamp 206 to the support bracket 204 and to position the torque tube 202 between the tube clamp 206, the first support device 314, the second support device 316, the support bracket 204, or some combination thereof. In addition, the fasteners may cause the tube clamp 206 to apply a force on the torque tube 202 to cause the torque tube 202 to physically engage with the tube clamp 206, the support bracket 204, the first support device 314, the second support device 316, or some combination thereof.

In some embodiments, the first support device 314, the second support device 316, or both may physically engage with the tube clamp 206. For example, the first support device 314 and the second support device 316 may define openings configured to receive portions of the tube clamp 206. For example, the openings may include through holes, slots, or any other appropriate shape that is sized and/or shaped to receive portions of the tube clamp 206. The first support device 314 and the second support device 316 may physically engage with the tube clamp 206 to resist rotation of first support device 314 and the second support device 316 relative to the tube clamp 206. An example support device 400 including the openings is discussed in more detail below in relation to FIGS. 4A-4C.

The tube clamp 206, the top surface 318 of the support bracket 204, the first support device 314, the second support device 316, or some combination thereof may physically engage with the surfaces 212 of the torque tube 202 to resist rotation of the torque tube 202 relative to the attachment structure 109. For example, the tube clamp 206, the top surface 318 of the support bracket 204, the first support device 314, the second support device 316, or some combination thereof may physically engage with each or a portion of the surfaces 212 of the torque tube 202.

The tube clamp 206, the top surface 318 of the support bracket 204, the first support device 314, the second support device 316, or some combination thereof may support the surfaces 212 of the torque tube 202 to resist deformation of the torque tube 202 due to the rotation of the torque tube 202. In some embodiments, the first surface 326 may support the sixth surface 212*f* of the torque tube 202. In these and other embodiments, the second surface 328 may support the fourth surface 212*d* of the torque tube 202. Alternatively or additionally, the top surface 318 of the support bracket 204 may support the fifth surface 212*e* of the torque tube 202. Further, the interior surfaces 324*a-e* may support the first surface 212*a*, the second surface 212*b*, the third surface 212*c*, the seventh surface 212*g*, the eighth surface 212*h*, or some combination thereof of the torque tube 202.

The tube clamp 206, the top surface 318 of the support bracket 204, the first support device 314, the second support device 316, or some combination thereof may distribute a load of the torque tube 202 due to the rotation of the torque tube 202. For example, the load of the torque tube 202, due to the rotation of the torque tube 202, may be distributed between the first surface 326, the second surface 328, the interior surfaces 324*a-e*, the top surface 318 of the support bracket 204, or some combination thereof.

In some embodiments, the first support device 314 and the second support device 316 may include wedge shapes. In these and other embodiments, the first support device 314, the second support device 316, or both may be wedged between portions of the surfaces 212 and the support bracket 204 and corresponding portions 313 and 315 of the tube clamp 206. For example, the first support device 314 may be wedged between the sixth surface 212*f* and the top surface 318 of the support bracket 204 and a portion 313 of the tube clamp 206. As another example, the second support device 316 may be wedged between the fourth surface 212*d* and the top surface 318 of the support bracket 204 and a portion 315 of the tube clamp 206. The portion 313 of the tube clamp 206 may correspond to a first longitudinal axis 322*a* (illustrated in FIG. 3B) and the portion 315 of the tube clamp 206 may correspond to a second longitudinal axis 322*b* (illustrated in FIG. 3B).

In some embodiments, the first support device 314 and the second support device 316 may be mechanically coupled to each other via an attachment member (not illustrated in FIGS. 3A-3C). The attachment member may be physically positioned between the fifth surface 212*e* and the top surface 318 of the support bracket 204. In addition, the attachment member may physically engage with the fifth surface 212*e* of the torque tube 202 and the top surface 318 of the support bracket 204. In these and other embodiments, the first support device 314, the second support device 316, and the attachment member may include a single continuous piece of material. Alternatively, the attachment member may operably interface with the first support device 314 and the second support device 316 via fasteners or any appropriate connector.

As illustrated in FIGS. 3A and 3B, the first surface 326, the second surface 328, the top surface 318 of the support bracket 204, and the interior surfaces 324 may form an octagonal cross-sectional shape. However, the first surface 326, the second surface 328, the top surface 318 of the support bracket 204, the interior surfaces 324, or some combination thereof may form any appropriate cross-sectional shape that is shaped and sized to mate flush with a portion or all of the surfaces 212 of the torque tube 202. For example, if the torque tube 202 includes a hexagonal cross-sectional shape, the first surface 326, the second surface 328, the top surface 318 of the support bracket 204, the interior surfaces 324, or some combination thereof may form a hexagonal cross-sectional shape.

In some embodiments, the first surface 326 may be on a plane 320*a* (illustrated in FIG. 3B) that is forty-five degrees offset from the top surface 318 of the support bracket 204. In these and other embodiments, the first surface 326 may be on the plane 320*a* that is negative forty-five degrees offset from the first longitudinal axis 322*a* of the corresponding portion 313 of the tube clamp 206. In some embodiments, the second surface 328 may be on a plane 320*b* (illustrated in FIG. 3B) that is negative forty-five degrees offset from the top surface 318 of the support bracket 204. In these and other embodiments, the second surface 328 may be on the plane 320*b* that is forty-five degrees offset from the second longitudinal axis 322*b* of the corresponding portion 315 of the tube clamp 206. In FIGS. 3A-3C, a positive offset value indicates a relative clockwise rotation in the FIGS. and a negative offset indicate a relative counterclockwise rotation in the FIGS.

Figure 4A:
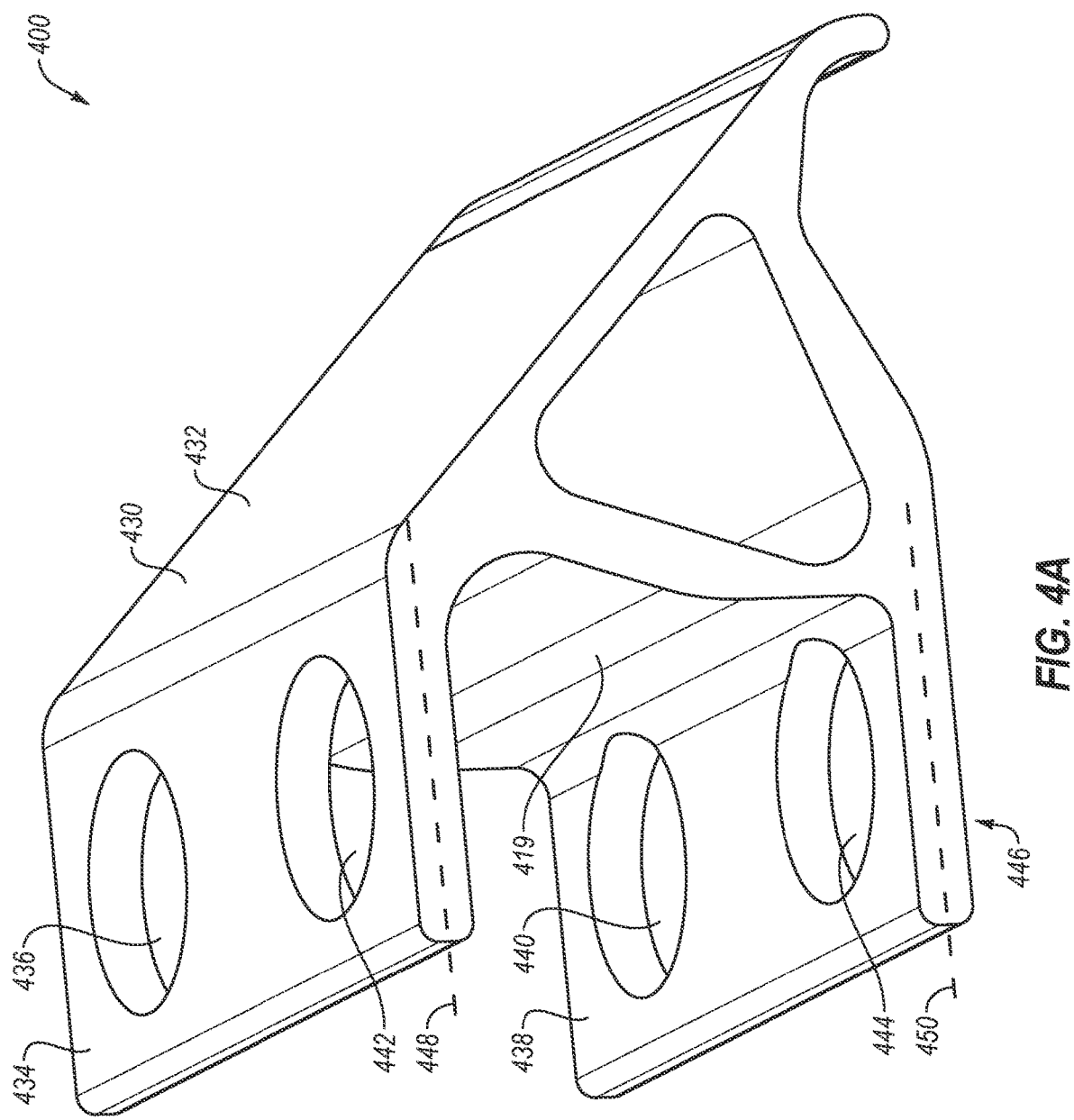
Figure 4B:
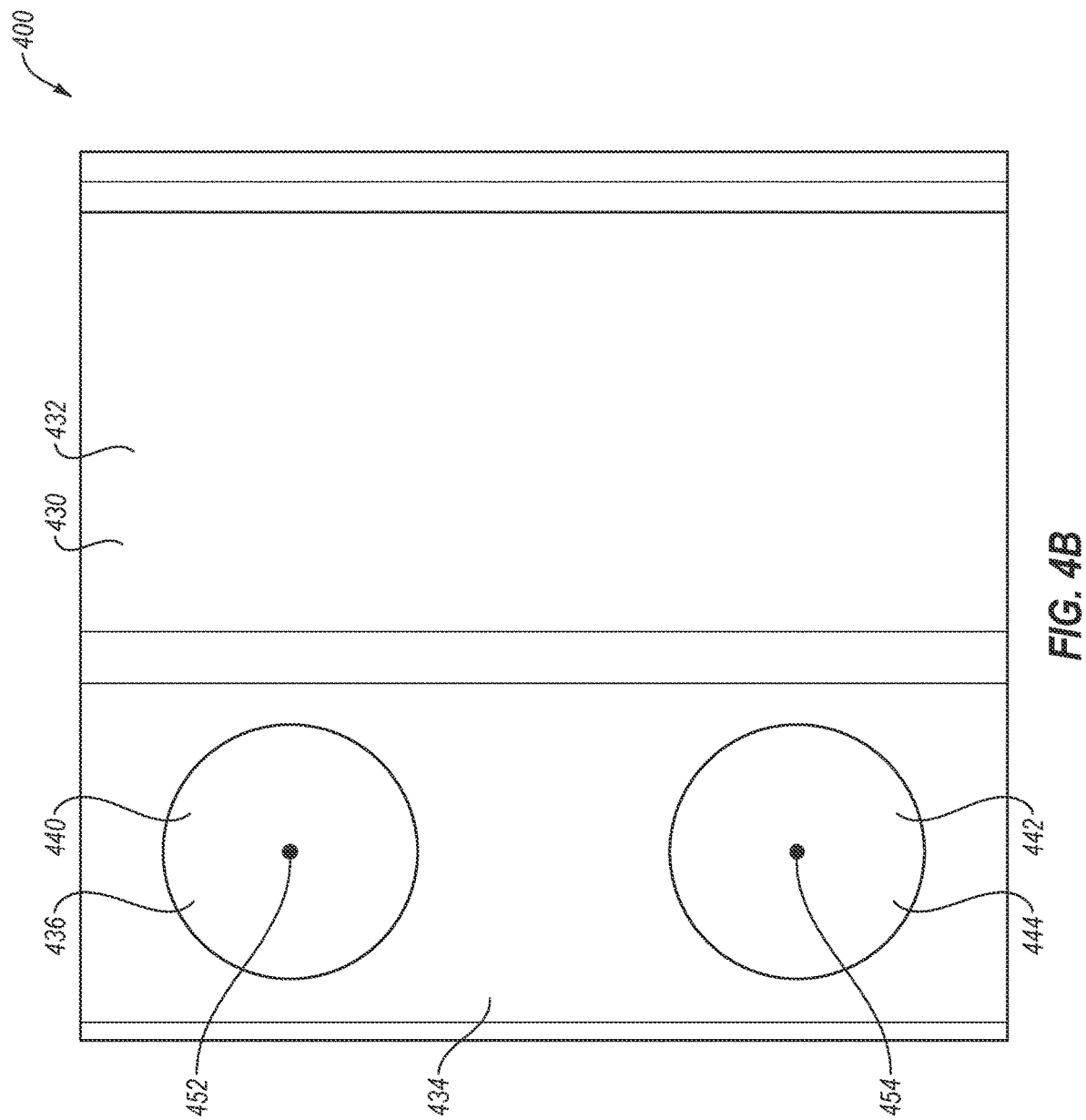

FIGS. 4A-4C illustrate a perspective view, a top view, and a rear view, respectively, of one example of the support device 400 of FIGS. 3A-3C. The support device 400 may correspond to the first support device 314, the second support device 316, or both of FIGS. 3A-3C.

The support device 400 may include a body 430, a first flange 434, and a second flange 438. The body 430 may include a surface 432 that is configured to physically engage with one or more of the surfaces 212 of the torque tube 202. The surface 432 may physically engage with one or more of the surfaces 212 of the torque tube 202 to resist rotation of the torque tube 202 relative to the tube clamp 206, the support bracket 204, and the support device 400. The surface 432 may correspond to the first surface 326 or the second surface 328 of FIGS. 3A-3C.

The first flange 434 may be mechanically coupled to the body 430. In addition, the second flange 438 may be mechanically coupled to the body 430. The first flange 434 and the second flange 438 may extend away from the body 430. The first flange 434 may extend away from the body 430 on a first plane 448. The second flange 438 may extend away from the body on a second plane 450. In some embodiments, the second plane 450 may be parallel to the first plane 448. In other embodiments, the second plane 450 may not be parallel to the first plane 448.

The first flange 434 may define a first opening 436, a third opening 442, or both. The second flange 438 may define a second opening 440, a fourth opening 444, or both. In some embodiments, the second opening 440 and the first opening 436 may be coaxial around a first axis 452. In these and other embodiments, the fourth opening 444 and the third opening 442 may be coaxial around a second axis 454. In some embodiments, the first opening 436, the second opening 440, the third opening 442, the fourth opening 444, or some combination thereof may include slots that are sized and/or shaped to receive various configurations of the tube clamp 206.

The first opening 436 and the second opening 440 may be sized and shaped to receive a portion of the tube clamp 206 (e.g., a first portion or corresponding portion 313 or 315). The third opening 442 and the fourth opening 444 may be sized and shaped to receive a portion of the tube clamp 206 (e.g., a second portion or corresponding portion 313 or 315). The first opening 436 and the second opening 440 may receive the portion of the tube clamp 206 to resist movement of the support device 400 relative to the portion of the tube clamp 206. The third opening 442 and the fourth opening 444 may receive the portion of the tube clamp 206 to resist movement of the support device 400 relative to the portion of the tube clamp 206. In addition, the third opening 442 and the fourth opening 444 may receive the portion of the tube clamp 206 to resist rotation of the support device 400 relative to the portions of the tube clamp 206 (e.g., the first portion, the second portion, or the corresponding portions 313 or 315). For example, in some embodiments, the tube clamp 206 may include two U-shaped bolts, as illustrated in FIGS. 2-3C, and the first opening 436 and the second opening 440 may receive a portion of a first U-shaped bolt and the third opening 442 and the fourth opening 444 may receive a portion of a second U-shaped bolt to resist rotation of the support device 400 relative to the portions of the tube clamp 206.

In some embodiments, the tube clamp 206 may include one bolt and the first flange 434 may only define the first opening 436 and the second flange 438 may only define the second opening 440. In other embodiments, the tube clamp 206 may include three or more bolts and the first flange 434 and the second flange 438 may define a corresponding number of openings. For example, the first flange 434 and the second flange 438 may each define three openings.

In some embodiments, the second flange 438 may include a surface 446 configured to physically engage with the top surface 318 of the support bracket 204 to resist movement of the support device 400 relative to the support bracket 204. For example, the surface 446 of the second flange 438 may resist vertical movement of the support device 400 in a downward direction.

In some embodiments, a width of the support device 400 may be based on a number of openings defined by the first flange 434 and the second flange 438; a width of the support bracket 204; or both. For example, the width of the support device 400 may be sized to extend along a portion or an entire length of the width of the support bracket 204. As another example, the width of the support device 400 may be sized to permit an equal amount of material to extend between outside edges of the openings and sides of the support device 400.

In some embodiments, the support device 400 may include a unibody device. In other embodiments, the support device 400 may include a multi-piece device. The support device 400 may include a metal material, a steel material, an aluminum material, a plastic material, a high-density polyethylene material, or any other appropriate material.

The support device 400, as illustrated in FIGS. 4A-4C, may include a back wall 419. The support device 400 may include the back wall 419 if the material of the support device 400 is not strong enough to resist collapsing of the body 430 on its own. Alternatively, the support device 400 may omit the back wall 419 if the material of the support device 400 is strong enough to resist collapsing of the body 430.

Figure 5A:
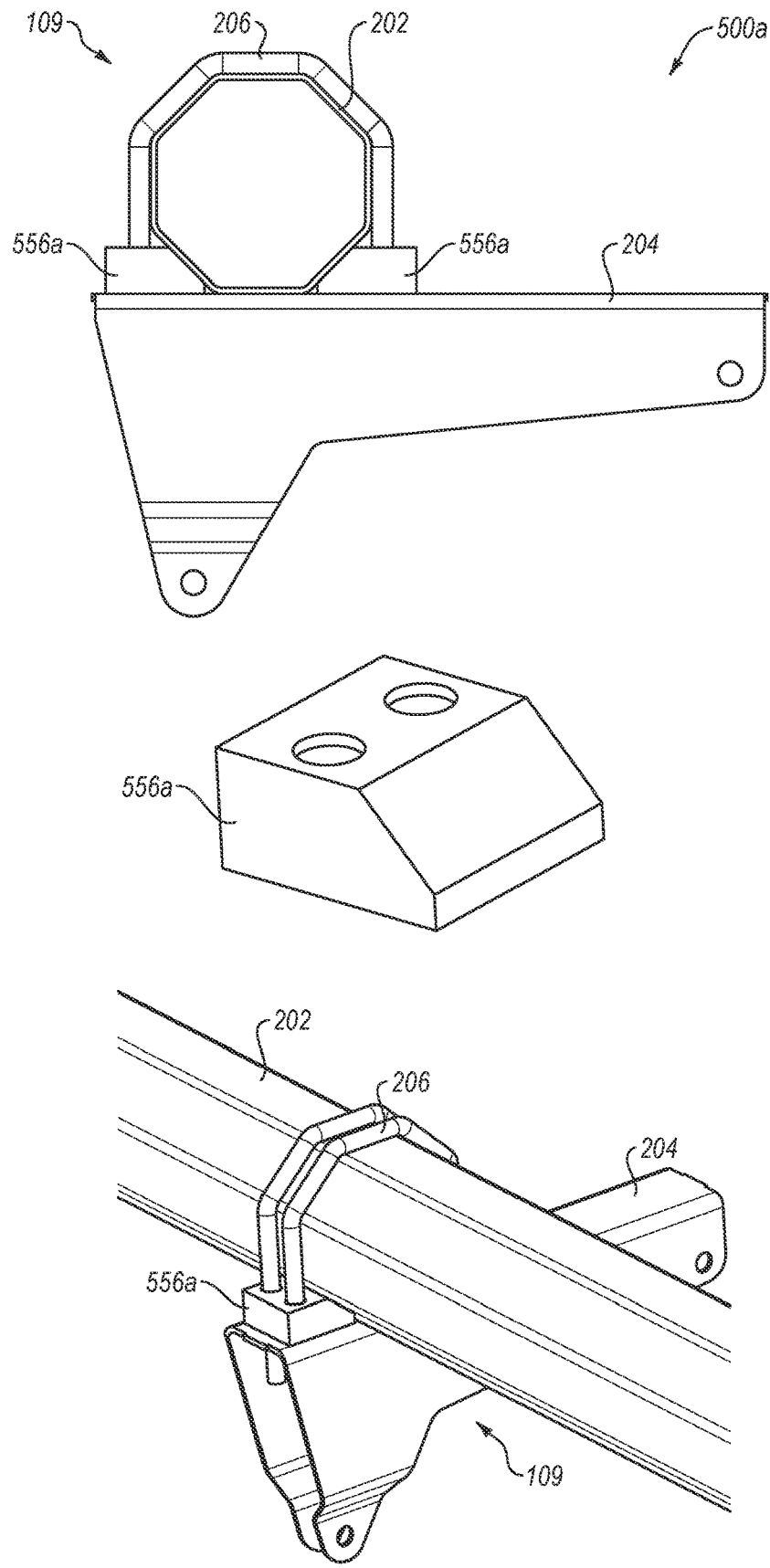
FIGS. 5A and 5B illustrate additional embodiments of example support devices with the attachment structure of FIG. 1.

FIG. 5A illustrates an additional embodiment 500a of an example support device 556a with the attachment structure 109 of FIG. 1. The support device 556a may operate the same as or similar to the support devices 314, 316, and 400 of FIGS. 3A-4C. For example, the support device 556a may provide support in the regions of the non-engaged surfaces of the torque tube 202. In addition, the support device 556a may cooperatively operate with the tube clamp 206 and the support bracket 204 to resist unintended rotation of the torque tube 202 relative to the attachment structure 109.

The support device 556a may include a solid block of material. For example, the support device 556a may include a plastic material. In addition, the support device 556a may include a single body (e.g., the material may be sized and shaped such that no flanges extend away from the body). The body of the support device 556a may define the openings configured to receive the portions of the tube clamp 206.

Figure 5B:
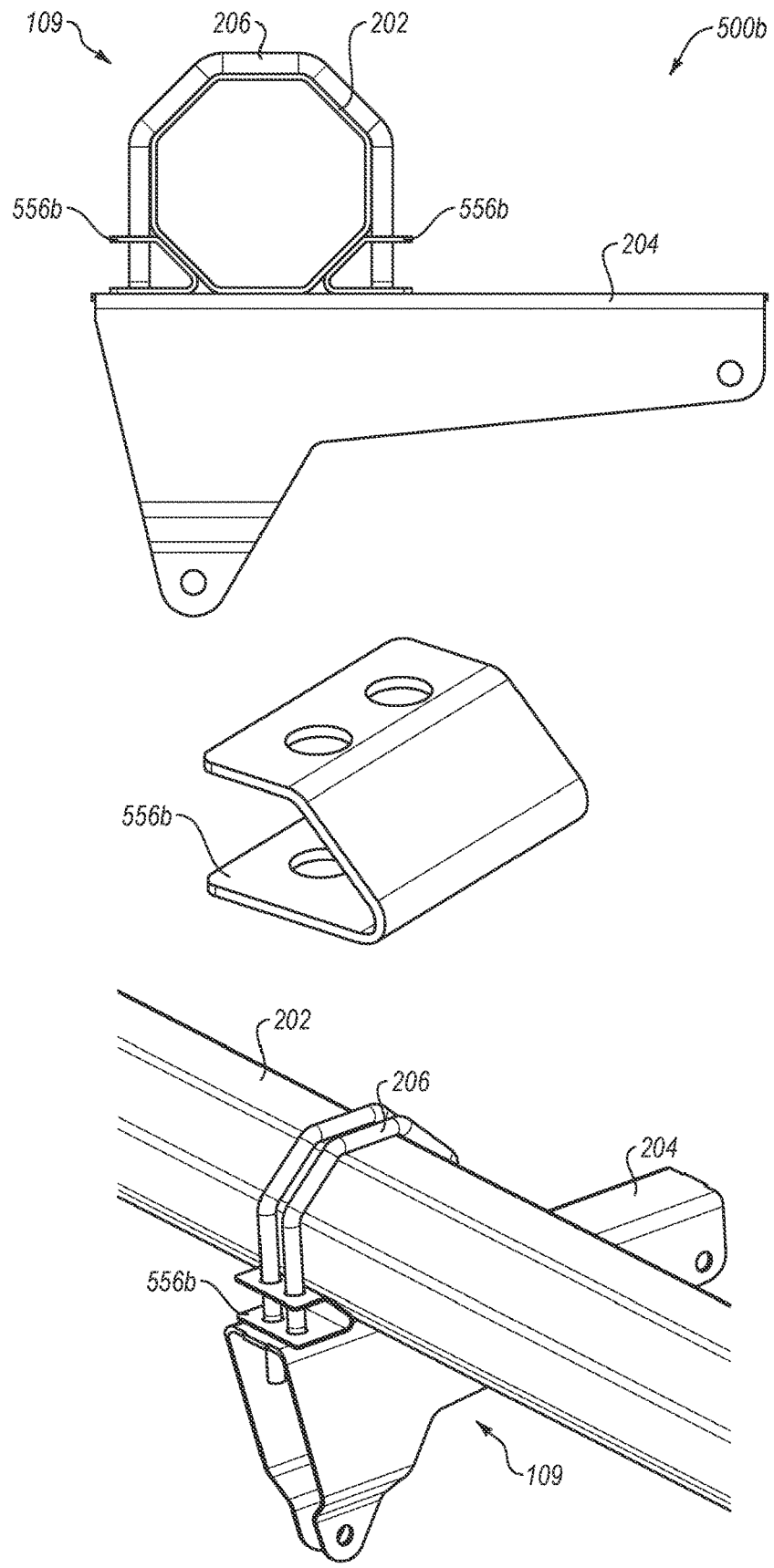

FIG. 5B illustrates another embodiment 500b of an example support device 556b with the attachment structure 109 of FIG. 1. The support device 556b may operate the same as or similar to the support devices 314, 316, and 400 of FIGS. 3A-4C. For example, the support device 556b may provide support in the regions of the non-engaged surfaces of the torque tube 202. In addition, the support device 556b may cooperatively operate with the tube clamp 206 and the support bracket 204 to resist unintended rotation of the torque tube 202 relative to the attachment structure 109. The support device 556b may include a sheet of material. For example, the support device 556*b* may include a sheet of metal. In addition, the support device 556*b* may omit the back wall.

FIG. 6A illustrates the example attachment structure 109 of FIG. 1, further including an example support device 668*a*. The support device 668*a* may add structural support to the physical engagement between the torque tube 202 and the attachment structure 109. The support device 668*a* may include a rod support device. The support device 668*a* may be configured to physically interface with holes defined by the torque tube 202. The support device 668*a* may provide additional support in the regions of the engaged surfaces of the torque tube 202.

The support device 668*a* may include a rod 601 that extends across a width of the torque tube 202. The rod 601 may include threaded portions (not illustrated in FIG. 6A) configured to operably interface with fasteners 603*a-b*. The fasteners 603*a-b* may operably interface with the threaded portions to draw blocks/washers 605*a-b* towards the tube clamp 206. The support device 668*a* may apply a force via the blocks/washers 605*a-b* on the tube clamp 206, the surfaces 212, or both to provide additional support of the physical engagement between the tube clamp 206 and the torque tube 202. The support device 668*a* may cooperatively operate with the tube clamp 206 and the support bracket 204 to add structural support to the physical engagement between the tube clamp 206 and the support bracket 204 and the torque tube 202.

Figure 6B:
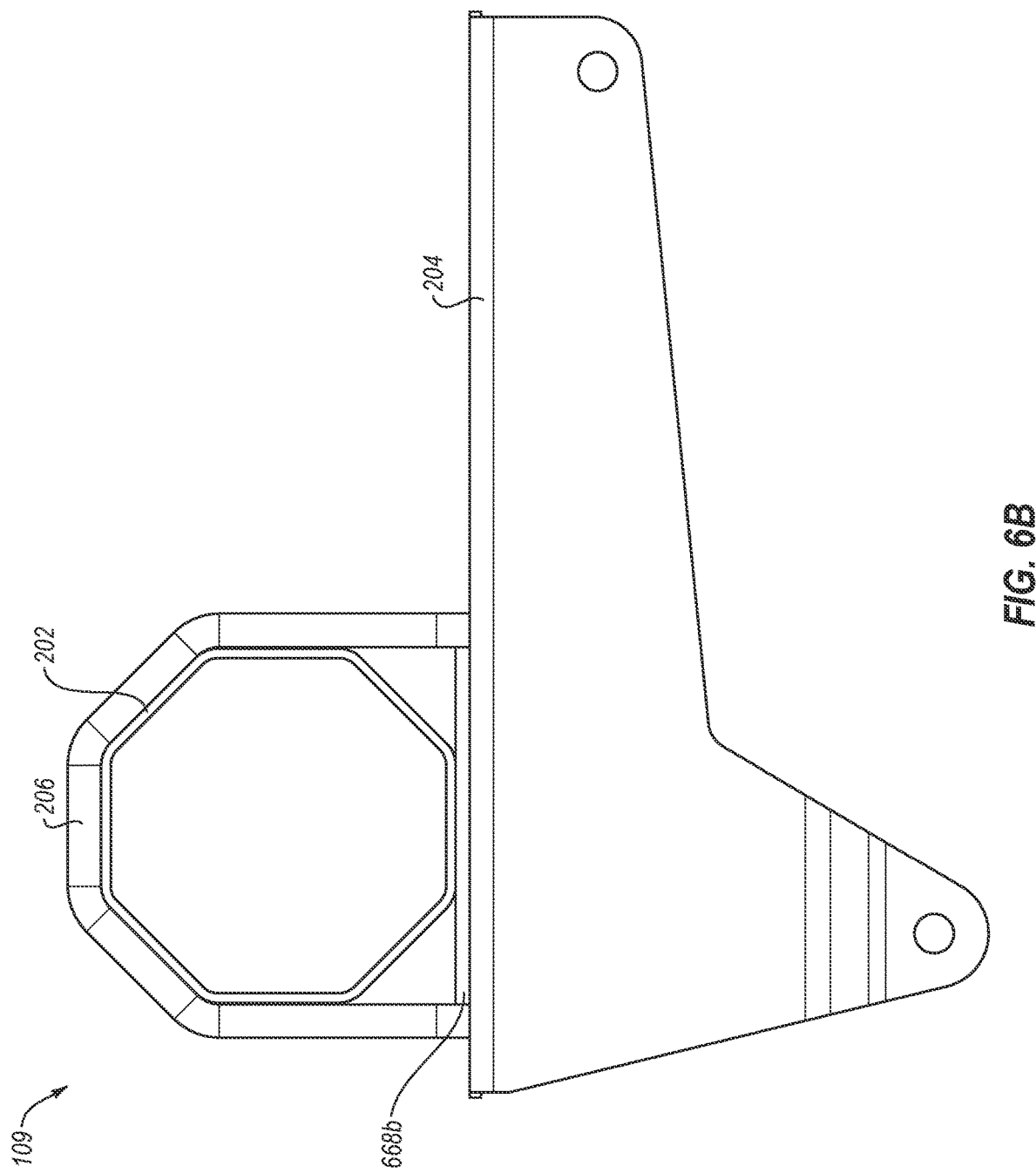

FIG. 6B illustrates another example support device 668*b* and the attachment structure 109 of FIG. 1. The support device 668*b* may include a support plate (e.g., a support saddle). The support device 668*b* may provide additional support in the regions of the engaged surfaces of the torque tube 202.

The support device 668*b* may be physically positioned between the fifth surface 212*e* and the support bracket 204 (e.g., underneath the torque tube 202). In addition, the support device 668*b* may physically engage with the fifth surface 212*e* and the support bracket 204. The support device 668*b* may cooperatively operate with the tube clamp 206 and the support bracket 204 to strengthen the physical engagement between the torque tube 202 and the attachment structure 109; distribute the load due to the rotation of the torque tube 202, or both.

Figure 6C:
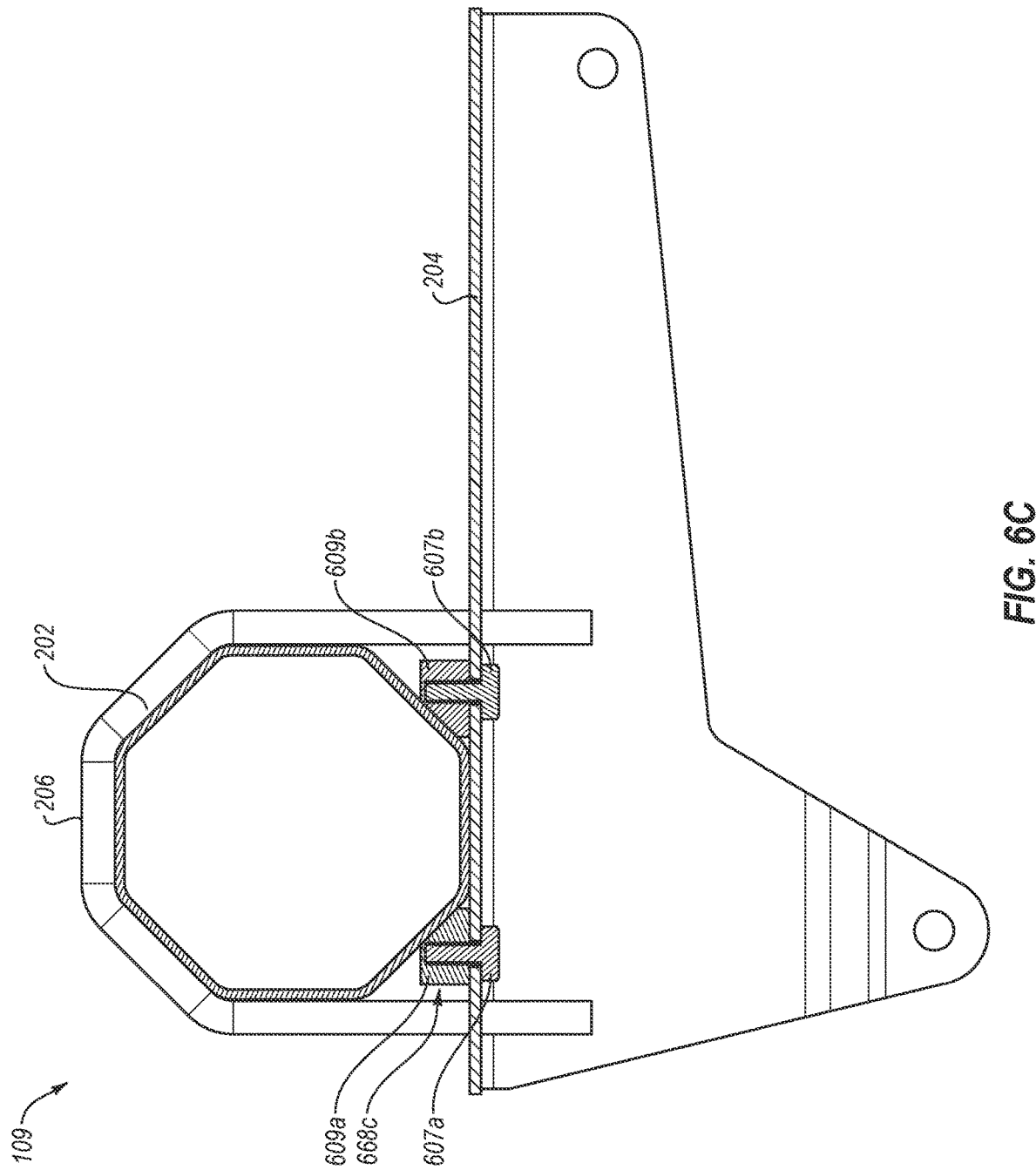

FIG. 6C illustrates an additional example support device 668*c* and the attachment structure 109 of FIG. 1. The support device 668*c* may include screw on wedge devices that operably interface with the support bracket 204 via screws or other fasteners. The support device 668*c* may provide support in the regions of the non-engaged surfaces of the torque tube 202.

The support device 668*c* may include wedges 609*a-b* that operably interface with the support bracket 204 via fasteners 607*a-b* from underneath the support bracket 204. The support bracket 204 may define holes (not illustrated in FIG. 6C) that permit the fasteners 607*a-b* to pass through and attach to the wedges 609*a-b* (e.g., via bolts embedded in the wedges) of the support device 668*c* to draw the wedges 609*a-b* toward the support bracket 204.

Figure 6D:
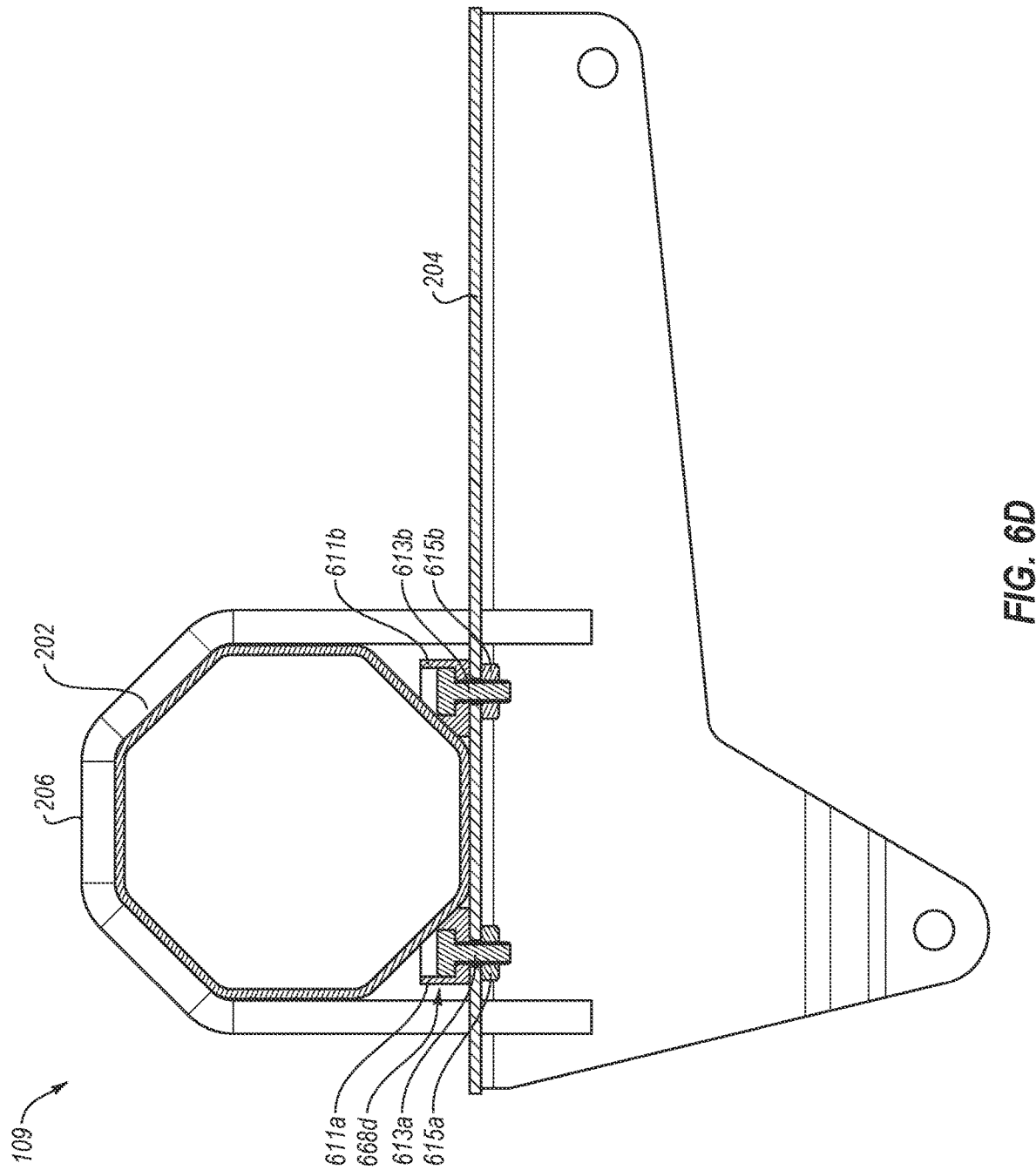

FIG. 6D illustrates yet another example support device 668*d* and the attachment structure 109 of FIG. 1. The support device 668*d* may include screw on wedge devices that operably interface with the support bracket 204 via screws or other fasteners. The support device 668*d* may provide support in the regions of the non-engaged surfaces of the torque tube 202.

The support device 668*d* may include wedges 611*a-b* that include fasteners 613*a-b* that are configured to operably interface with bolts 615*a-b* underneath the support bracket 204. The support bracket 204 may define holes that permit the fasteners 613*a-b* to pass through and attach to the bolts 615*a-b* of the support device 668*d* to draw the wedges 611*a-b* toward the support bracket 204.

Figure 6E:
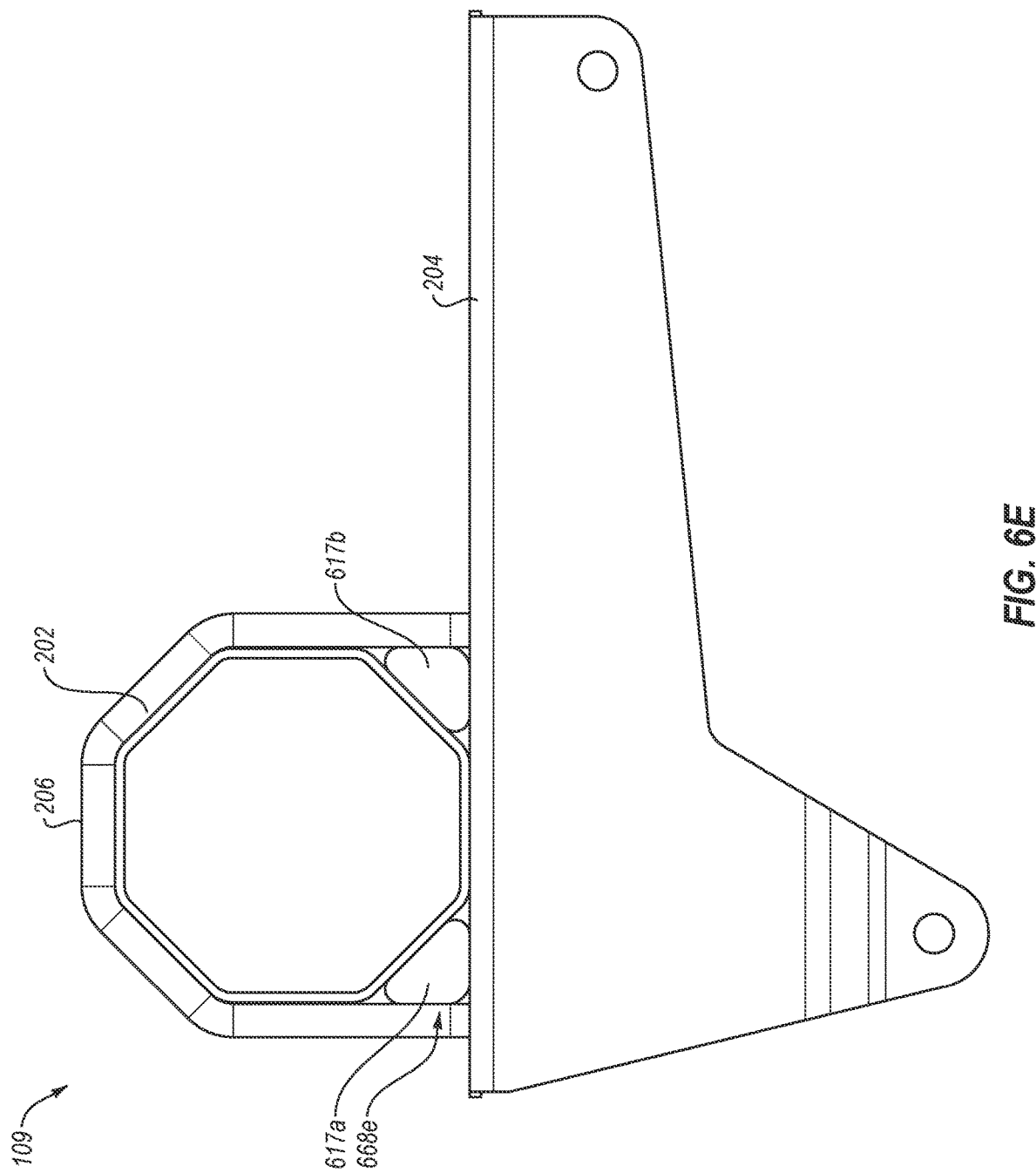

FIG. 6E illustrates yet another example support device 668*e* and the attachment structure 109 of FIG. 1. The support device 668*e* may include spacer tubes 617*a-b* that are crushed between the torque tube 202, the tube clamp 206, and the support bracket 204 during installation. In some embodiments, the spacer tubes 617*a-b* may include circularly shaped pieces of material. In other embodiments, the spacer tubes 617*a-b* may include differently shaped pieces of material, such as a right-angle triangle, a square, an oval, a rectangle, or any other appropriate shape. The spacer tubes 617*a-b* may operate similarly to the support devices 314, 316, and 400 of FIGS. 3A-4C to spread a load, resist unintended rotation of the torque tube 202 relative to the attachment structure 109, or both. For example, the spacer tubes 617*a-b* may provide support in the regions of the non-engaged surfaces of the torque tube 202.

Figure 6F:
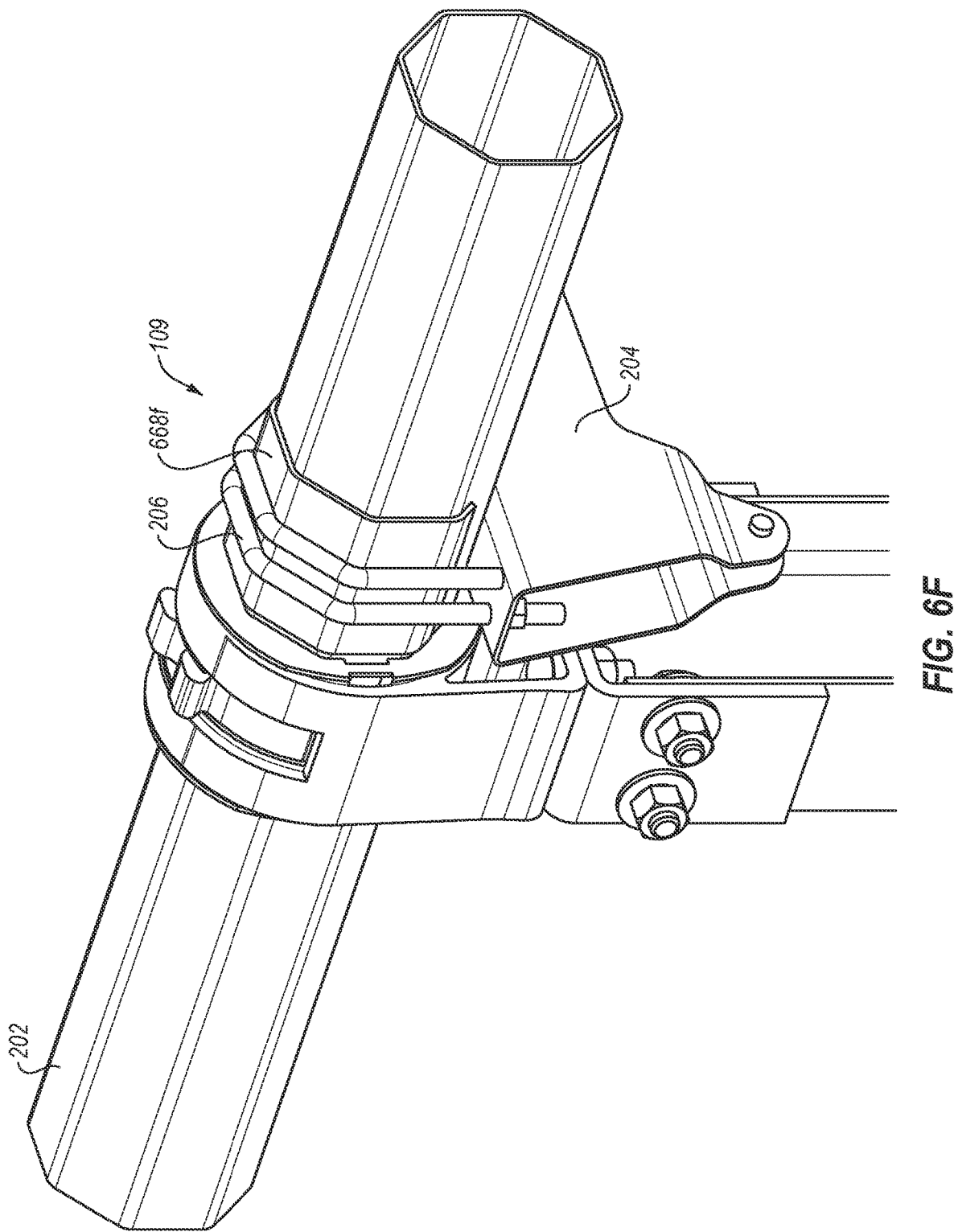

FIG. 6F illustrates yet another example support device 668*f* and the attachment structure 109 of FIG. 1. The support device 668*f* may act as a sleeve around the torque tube 202. The support device 668*f* may slide over the torque tube 202 and may be physically positioned underneath the tube clamp 206 (e.g., positioned so as to be physically between the torque tube 202 and the tube clamp 206). The support device 668*f* may physically engage with a portion of the surfaces 212 of the torque tube 202. In addition, the support device 668*f* may provide support in the regions of the engaged surfaces, the non-engaged surfaces, or both of the torque tube 202.

Figure 7:
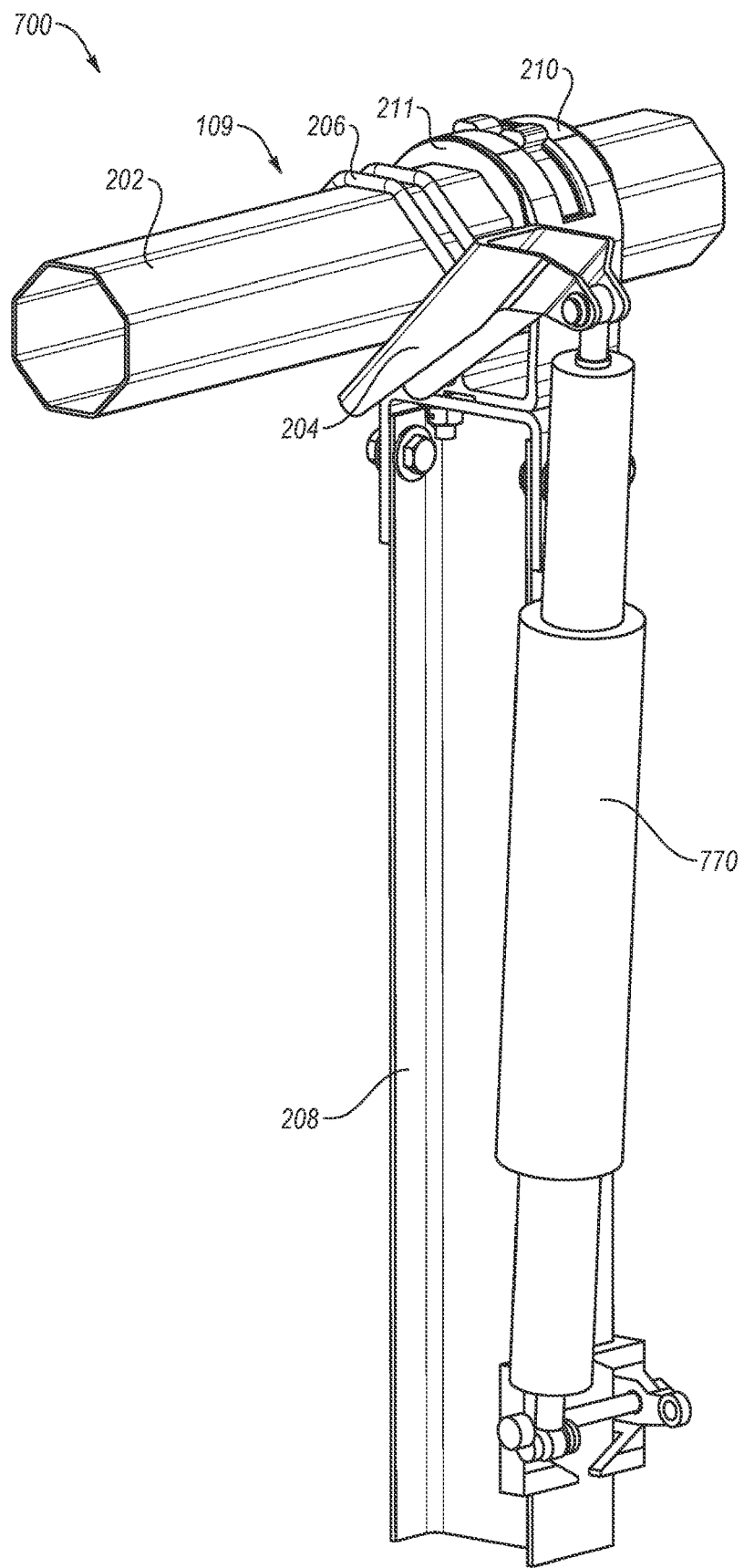
FIG. 7 illustrates an example damping system that may be implemented in the solar tracking system of FIG. 1.

FIG. 7 illustrates an example damping system 700 that may be implemented in the solar tracking system 100 of FIG. 1. The damping system 700 may operate the same as or similar to the damping system 105 of FIG. 2. However, instead of a spring and damper, the damping system 700 may include a coil over damper (COD) 770.

The COD 770 (via the support bracket 204 and the tube clamp 206) may act to dampen rotational forces exerted on the torque tube 202 as it is rotated relative to the mounting mechanism or bearing bracket 210 via the bearing 211. In some embodiments, as the torque tube 202 is rotated, the COD 770 may apply a biasing force on the support bracket 204 to reduce, resist, or control movement of the torque tube 202. For example, the COD 770 may apply a spring force on the support bracket 204 to dampen or control the movement of the torque tube 202.

In some embodiments, the COD 770 may apply a biasing force on the support bracket 204 (e.g., the torque tube 202 via the support bracket 204 and the tube clamp 206) to dampen the movement of the torque tube 202. For example, the damping of the movement of the support bracket 204 (e.g., the torque tube 202) may dampen oscillation movements of the torque tube 202 due to the rotation of the torque tube 202.

FIGS. 8A-8C illustrate example configurations 800*a-c* of the example attachment structure 109 of FIG. 1 and the support devices 314 and 316. As illustrated in FIGS. 8A-8C, the attachment structure 109, the first support device 314, the second support device 316, or some combination thereof may physically engage with only a portion of the surfaces 212 of the torque tube 202. As illustrated in a first example configuration 800*a* shown in FIG. 8A, the fifth surface 212*e* and the top surface 318 of the support bracket 204 may form the gap 327a. As another example, as illustrated in a second example configuration 800b shown in FIG. 8B, the second surface 212b and the tube clamp 206 may form a gap 327b, the third surface 212c and the tube clamp 206 may form a gap 327c, the fifth surface 212e and the top surface 318 of the support bracket 204 may form the gap 327a, the seventh surface 212g and the tube clamp 206 may form a gap 327d, and the eighth surface 212h and the tube clamp 206 may form a gap 327e. As yet another example, as illustrated in a third example configuration 800c shown in FIG. 8C, the first surface 212a and the tube clamp 206 may form a gap 327h, the third surface 212c and the tube clamp 206 may form the gap 327c, the fourth surface 212d and the second support device 316 may form a gap 327f, the sixth surface 212f and the first support device 314 may form a gap 327g, and the seventh surface 212g and the tube clamp 206 may form the gap 327d.

FIGS. 9A and 9B illustrate the example attachment structure 109 of FIG. 1 and the example torque tube 202 of FIG. 1. The tube clamp 206 as illustrated in FIGS. 9A and 9B, may be over torqued causing the torque tube 202 to be subjected to high compressive forces. The high compressive forces applied by the tube clamp 206 may cause the fifth surface 212e of the torque tube 202 to deform since there are no support devices to enhance the connection surface area of the attachment structure 109. As illustrated in FIGS. 9A and 9B, the deformation may include the fifth surface 212e of the torque tube 202 curving toward an internal volume of the torque tube 202.

Figure 10:
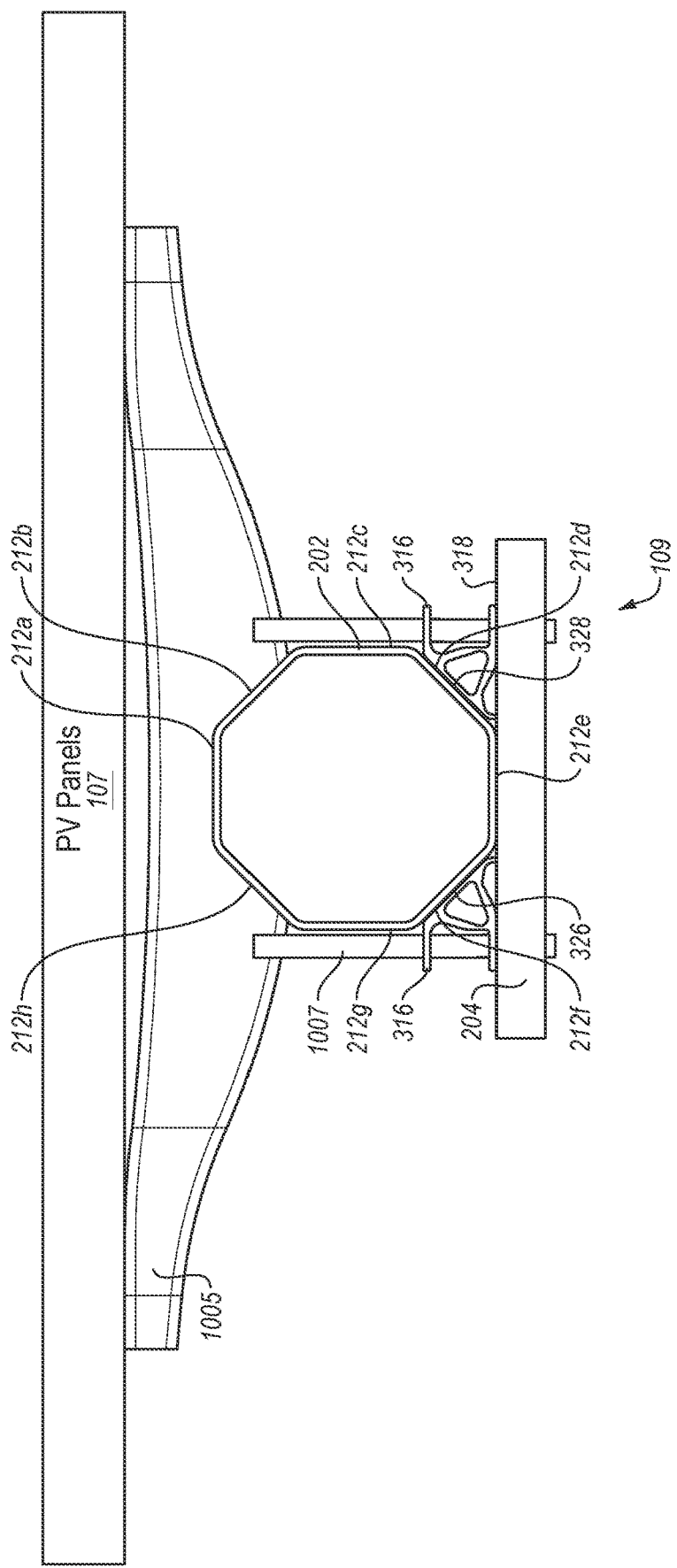
FIG. 10 illustrates additional details of the example solar tracking system of FIG. 1, including the example attachment structure that operatively connects the PV panel to the torque tube and the example support devices.

FIG. 10 illustrates additional details of the example solar tracking system 100 of FIG. 1, including the example attachment structure 109 that connects the PV panels 107 to the torque tube 202. In this particular example, the attachment structure 109 connects the PV panels 107 to the torque tube 202. Although other configurations could be used, the illustrated attachment structure 109 may include a PV support bracket 1005, a PV tube clamp 1007, and the support bracket 204. The PV tube clamp 1007, as illustrated in FIG. 10, may include multiple bolts. In some embodiments, the PV tube clamp 1007 may include one bolt or three or more bolts. It will be appreciated that the PV tube clamp 1007 might have various other configurations and shapes. The attachment structure 109 may operably interface with the torque tube 202 to mechanically couple the torque tube 202 to the PV panels 107 via the PV support bracket 1005.

The attachment structure 109, including the PV tube clamp 1007, the PV support bracket 1005, and the top surface 318 of the support bracket 204, may be sized and shaped to physically engage with at least some of the surfaces 212 of the torque tube 202. For example, as illustrated in FIG. 10, the PV tube clamp 1007 may be sized and shaped to physically engage with the third surface 212c, the seventh surface 212g, or both of the torque tube 202. In addition, the top surface 318 may physically engage with the fifth surface 212e of the torque tube 202. Further, the PV support bracket 1005 may physically engage with the first surface 212a, at least a portion of the second surface 212b, at least a portion of the eighth surface 212h, or some combination thereof of the torque tube 202.

As illustrated in FIG. 10, the PV tube clamp 1007, the PV support bracket 1005, and the support bracket 204 may not physically engage with the fourth surface 212d and the sixth surface 212f of the torque tube 202. However, the first surface 326 of the first support device 314 may physically engage with the sixth surface 212f and the second surface 328 of the second support device 316 may physically engage with the fourth surface 212d.

As the torque tube 202 is rotated, the PV support bracket 1005 may apply a force on the PV panels 107 to direct the PV panels 107 at the sun throughout the sun's daily movement in the sky.

What is claimed is:

1. A support device comprising:
   a body comprising:
      a first surface configured to physically engage with at least a first surface section of a torque tube, wherein at least a second surface section of the torque tube is configured to engage with a top surface of an attachment structure; and
      a second surface configured to engage with the top surface of the attachment structure to resist movement of the support device relative to the attachment structure, wherein the body and the attachment structure together define an aperture configured to receive the torque tube.

2. The support device of claim 1, wherein the attachment structure comprises a tube clamp, the support device further comprising:
   a first flange mechanically coupled to the body, the first flange:
      defining a first opening that is sized and shaped to receive a first portion of the tube clamp;
      defining a third opening that is sized and shaped to receive a second portion of the tube clamp;
   a second flange mechanically coupled to the body, the second flange:
      defining a second opening that is sized and shaped to receive the first portion of the tube clamp, the second opening being coaxial with the first opening, the first opening and the second opening being configured to receive the first portion of the tube clamp to resist movement of the support device relative to the first portion of the tube clamp; and
      defining a fourth opening that is sized and shaped to receive the second portion of the tube clamp, the fourth opening being coaxial with the third opening, the third opening and the fourth opening being configured to receive the second portion of the tube clamp to:
         resist movement of the support device relative to the second portion of the tube clamp; and
         resist rotation of the support device relative to the first portion of the tube clamp and relative to the second portion of the tube clamp.

3. The support device of claim 1, wherein:
   the attachment structure comprises a support bracket comprising the top surface and the second surface of the body is configured to engage with the
   top surface of the support bracket.

4. The support device of claim 2, wherein:
   the first flange extends away from the body on a first plane;
   the second flange extends away from the body on a second plane; and
   the second plane is parallel to the first plane.

5. The support device of claim 1, wherein the first surface of the body is configured to physically engage with at least the first surface section of the torque tube to provide support of the torque tube to resist deformation of the torque tube during loading events.

6. The support device of claim 1, wherein:
the attachment structure comprises a tube clamp and a support bracket, the support bracket comprising the top surface; and
the surface of the body is on a plane that is forty-five degrees offset from the top surface of the support bracket and negative forty-five degrees offset from a longitudinal axis of a corresponding portion of the tube clamp.

7. The support device of claim 1, wherein the support device comprises a unibody device comprising a metal material, a steel material, an aluminum material, a plastic material, or a high-density polyethylene material.

8. The support device of claim 1, wherein the body comprises a first body and the support device further comprises
a second body comprising a surface configured to physically engage with at least a third surface section of the torque tube to further define the aperture configured to receive the torque tube; and
an attachment member mechanically coupled to the first body and the second body, the attachment member configured to physically engage with at least a fourth surface section of the torque tube to further define the aperture configured to receive the torque tube.

9. The support device of claim 8, wherein the attachment member, the first body, and the second body form a unibody device.

10. A system comprising:
an attachment structure comprising:
a support bracket configured to operably interface with a torque tube; and
a tube clamp configured to operably interface with the support bracket and the torque tube; and
a support device configured to be physically positioned between the tube clamp, the torque tube, and the support bracket, wherein:
the torque tube comprises a plurality of surfaces; and
the tube clamp, the support bracket, and the support device are configured to physically engage with the plurality of surfaces to resist rotation of the torque tube relative to the tube clamp, the support bracket, and the support device.

11. The system of claim 10, wherein:
the support device comprises a first support device;
the system further comprises a second support device configured to be physically positioned between the tube clamp, the torque tube, and the support bracket; and
the tube clamp, the support bracket, the first support device, and the second support device are configured to physically engage with the plurality of surfaces to resist rotation of the torque tube relative to the tube clamp, the support bracket, the first support device, and the second support device.

12. The system of claim 11, wherein the first support device is mechanically coupled to the second support device via an attachment member to form a unibody device comprising the first support device, the second support device, and the attachment member.

13. The system of claim 10, wherein the support device comprises a first surface configured to physically engage with a first surface of the torque tube.

14. The system of claim 13, wherein the first surface is on a first plane that is forty-five degrees offset from a top surface of the support bracket and negative forty-five degrees offset from a longitudinal axis of a corresponding portion of the tube clamp.

15. The system of claim 13, wherein:
the tube clamp comprises an interior surface configured to physically engage with a second surface of the torque tube; and
the support bracket comprises a top surface configured to physically engage with a third surface of the torque tube.

16. The system of claim 15, wherein the first surface, the top surface, and the interior surface mate flush with the plurality of surfaces of the torque tube.

17. The system of claim 10, wherein the support device is sized and shaped to address non-engaged surfaces between the torque tube and the attachment structure.

18. The system of claim 10, wherein:
the support device defines a first opening and a second opening, the first opening being coaxial with the second opening; and
the first opening and the second opening being configured to receive a first portion of the tube clamp.

19. The system of claim 10, wherein the tube clamp, the support bracket, and the support device are configured to support the torque tube to resist deformation of the torque tube during loading events.

20. The system of claim 10, wherein the tube clamp, the support bracket, and the support device are configured to distribute a load due to rotation of the torque tube.

* * * * *